(12) United States Patent
Seki et al.

(10) Patent No.: US 7,349,483 B2
(45) Date of Patent: Mar. 25, 2008

(54) COMMUNICATIONS DEVICE WITH DOPPLER FREQUENCY ESTIMATION FUNCTIONS

(75) Inventors: Hiroyuki Seki, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 799 days.

(21) Appl. No.: 10/783,791

(22) Filed: Feb. 20, 2004

(65) Prior Publication Data
US 2004/0190657 A1 Sep. 30, 2004

(30) Foreign Application Priority Data
Feb. 21, 2003 (JP) ............................. 2003-044509
Jan. 7, 2004 (JP) ............................. 2004-001794

(51) Int. Cl.
  *H04B 7/26* (2006.01)
  *H04K 1/10* (2006.01)
(52) U.S. Cl. ...................................... 375/260; 375/147
(58) Field of Classification Search ................ 375/142, 375/143, 145, 147, 148, 150, 152, 260; 370/208, 370/210, 320, 335, 342; 342/357.05, 357.12, 342/417, 418
See application file for complete search history.

(56) References Cited

U.S. PATENT DOCUMENTS

| | | | | |
|---|---|---|---|---|
| 5,107,466 A | * | 4/1992 | Nishiyama et al. ........... 367/90 |
| 5,272,446 A | * | 12/1993 | Chalmers et al. ........... 329/304 |
| 5,572,548 A | | 11/1996 | Pirez et al. | |
| 6,058,101 A | * | 5/2000 | Huang et al. ............... 370/208 |
| 6,631,174 B1 | | 10/2003 | Asahara et al. | |
| 6,807,224 B1 | * | 10/2004 | Takahashi et al. .......... 375/150 |
| 6,996,156 B1 | * | 2/2006 | Ono ........................... 375/147 |
| 7,123,670 B2 | * | 10/2006 | Gilbert et al. .............. 375/344 |
| 2001/0033547 A1 | * | 10/2001 | Izumi ........................ 370/203 |
| 2004/0091026 A1 | * | 5/2004 | Nakayama .................. 375/148 |
| 2004/0125873 A1 | * | 7/2004 | Han ........................... 375/226 |

FOREIGN PATENT DOCUMENTS

| | | |
|---|---|---|
| EP | 1 052 820 | 11/2000 |
| EP | 1 180 853 | 2/2002 |
| JP | 10-065610 | 6/1998 |

OTHER PUBLICATIONS

European Search Report dated Oct. 26, 2004.

* cited by examiner

*Primary Examiner*—Young T. Tse
(74) *Attorney, Agent, or Firm*—Katten Muchin Rosenman LLP

(57) ABSTRACT

A communications device with the capability of accurately estimating Doppler frequency for improved wireless communication. At radio frame intervals, a complex time-domain response measurement unit obtains complex time-domain response signals representing the characteristics of propagation paths. A phase difference calculator then calculates absolute phase differences between a selected set of complex time-domain response signals, such as those having the largest magnitude in respective frames. In the case where such maximum signals change their time positions frequently, the time position of the maximum signal in a particular frame is selected, and the complex time-domain response signals extracted from that fixed position in consecutive frames are subjected to the phase difference calculation. The mean value of those absolute phase differences are calculated over a plurality of radio frames by an average operator. Finally, a Doppler frequency estimator estimates Doppler frequency by dividing the mean value by the time length of the radio frame.

32 Claims, 20 Drawing Sheets

COMMUNICATIONS DEVICE WITH DOPPLER FREQUENCY ESTIMATION FUNCTIONS

BACKGROUND OF THE INVENTION

1. Field of the Invention

The present invention relates to a communications device, and more particularly to a communications device for communication over wireless channels.

2. Description of the Related Art

Recent years have seen an explosive growth in the number of users of mobile communications facilities such as cellular phone networks. Besides providing voice call functionality, today's mobile handsets are offering more and more capabilities for use as a multifunctional portable device, particularly with an enhanced support of Internet access. This trend is expected to lead to the development of more advanced multimedia services in the field of mobile applications.

In mobile communications, the propagation path characteristics change from moment to moment. As a mobile station moves, its line-of-sight path to the base station is often obstructed by buildings or other terrestrial objects. Such a dynamic nature of path characteristics causes degradation of quality of communication service, and how to overcome this challenge is one of the important issues in the mobile communications technology.

FIG. 20 shows a simplified model of propagation between a base station and a mobile station. Carrier waves transmitted from an antenna of the base station BS travel over two or more different routes before arriving at a mobile station MS. This is known as "multipath," the phenomenon that results in radio signals' reaching the receiving end via a plurality of paths because of the reflection from objects such as mountains and buildings. When the mobile station MS is moving, carrier waves coming from different directions suffer different amounts of Doppler shift, depending on the angle of arrival. The signal frequency observed at the moving mobile station MS is not constant, but varies since it is a sum of carrier frequency and Doppler frequency. The mobile station MS receives a plurality of such incoming radio wave signals with a broadened spectrum, experiencing significant fluctuations of received signal level, the phenomenon called "multipath fading."

The fading fluctuations described above result in an increased data error rate in wireless communications. A good estimate of Doppler frequency would allow the system to choose a suitable radio communication technique adaptively and achieve better performance in a given propagation environment. Thus, it would be beneficial if we could estimate the Doppler frequency accurately.

Researchers have investigated techniques for Doppler frequency estimation, and one such example is disclosed in the Japanese undexamined Patent Application No. 10-65610 (1998) (see paragraphs 0007 to 0017, FIG. 1). According to this publication, the average power of each path's despread signal is calculated, and of all those despread signals, the one with the largest power is subjected to the Fourier transform. The resultant power spectrum shows a point with the greatest amount of power, and the frequency of that point is used as an estimate of maximum Doppler frequency.

The above existing technique, however, allows noise components to affect the result of the estimation. Also, an increase in the number of multipath components and the consequent complex behavior of Doppler effects make it difficult to obtain an accurate Doppler frequency estimate.

Among other proposed techniques for Doppler frequency estimation, one method measures the interval of Doppler fluctuations. Another method repeats channel estimation at constant intervals and uses the phase differences between the obtained channel estimates for estimation. With those generally known methods, however, it is difficult to estimate Doppler frequency in a stable and accurate way when the receiver is in such conditions where the signal-to-noise (S/N) ratio is low.

SUMMARY OF THE INVENTION

In view of the foregoing, it is an object of the present invention to provide a communications device with the capability of accurately estimating Doppler frequency for improved wireless communication.

To accomplish the above object, according to the present invention, there is provided a communications device for communication over wireless channels. This communications device comprises the following elements: a complex impulse response measurement unit, a phase difference calculator, an average operator, and a Doppler frequency estimator. At radio frame intervals, the complex time-domain response measurement unit obtains complex time-domain response signals representing the characteristics of propagation paths. The phase difference calculator then calculates absolute phase differences between the complex time-domain response signals that are selected according to a predetermined algorithm. The average operator calculates a mean value of the absolute phase differences over a plurality of radio frames, and the Doppler frequency estimator estimates Doppler frequency by dividing the mean value by the time length of the radio frame.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
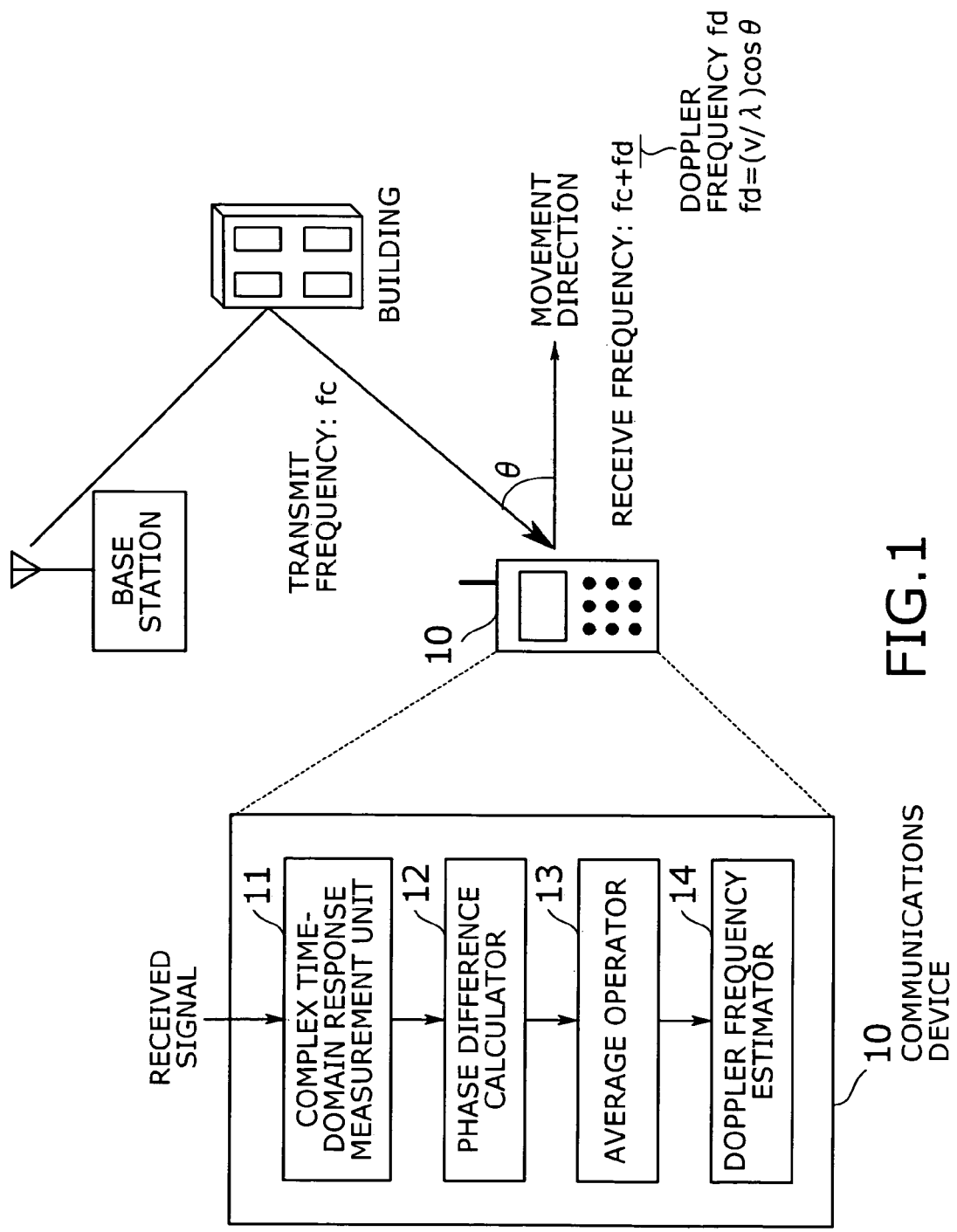
FIG. 1 is a conceptual view of a communications device according to the present invention.

Preferred embodiments of the present invention will be described below with reference to the accompanying drawings, wherein like reference numerals refer to like elements throughout.

FIG. 1 is a conceptual view of a communications device according to the present invention. This communications device 10 is implemented in, for example, a cellular handset or similar mobile communications equipment. The communications device 10 provides the capability of receiving radio waves in a multipath environment, and to this end, it comprises the following functional elements: a complex time-domain response measurement unit 11, a phase difference calculator 12, an average operator 13, and a Doppler frequency estimator 14.

For each radio frame interval, the complex time-domain response measurement unit 11 obtains "complex time-domain response signals" (or "complex impulse responses"), i.e., a set of measurements representing characteristics of the actual propagation paths. More specifically, the delay profile of a multipath channel can be obtained by calculating the power of a received signal in each short time interval. Because of multipath reflections, the delay profile is a series of impulses with different arrival times, each corresponding to a different propagation path. In the present invention, we call those individual impulses "impulse responses" or "complex impulse responses." Detailed definition of complex impulse response will be discussed later.

The phase difference calculator 12 calculates absolute phase differences between complex impulse responses that are selected with a predetermined algorithm. Those selected complex impulse responses are, for example, maximum complex impulse responses. We will use the term "maximum complex impulse responses" to refer to a set of complex impulse responses to be subjected to the phase difference calculator 12.

The average operator 13 calculates a mean value of the absolute phase differences over a plurality of radio frames. The Doppler frequency estimator 14 divides the mean value by the length of the radio frame, thereby estimating the Doppler frequency. We will describe the communications device 10 in detail later with reference to FIG. 9 and subsequent figures.

Doppler Frequency Estimation

This section provides detailed explanations for what problems the present invention is addressing. We will also discuss the importance of Doppler frequency estimation, besides showing the definition of Doppler frequency.

Figure 2:
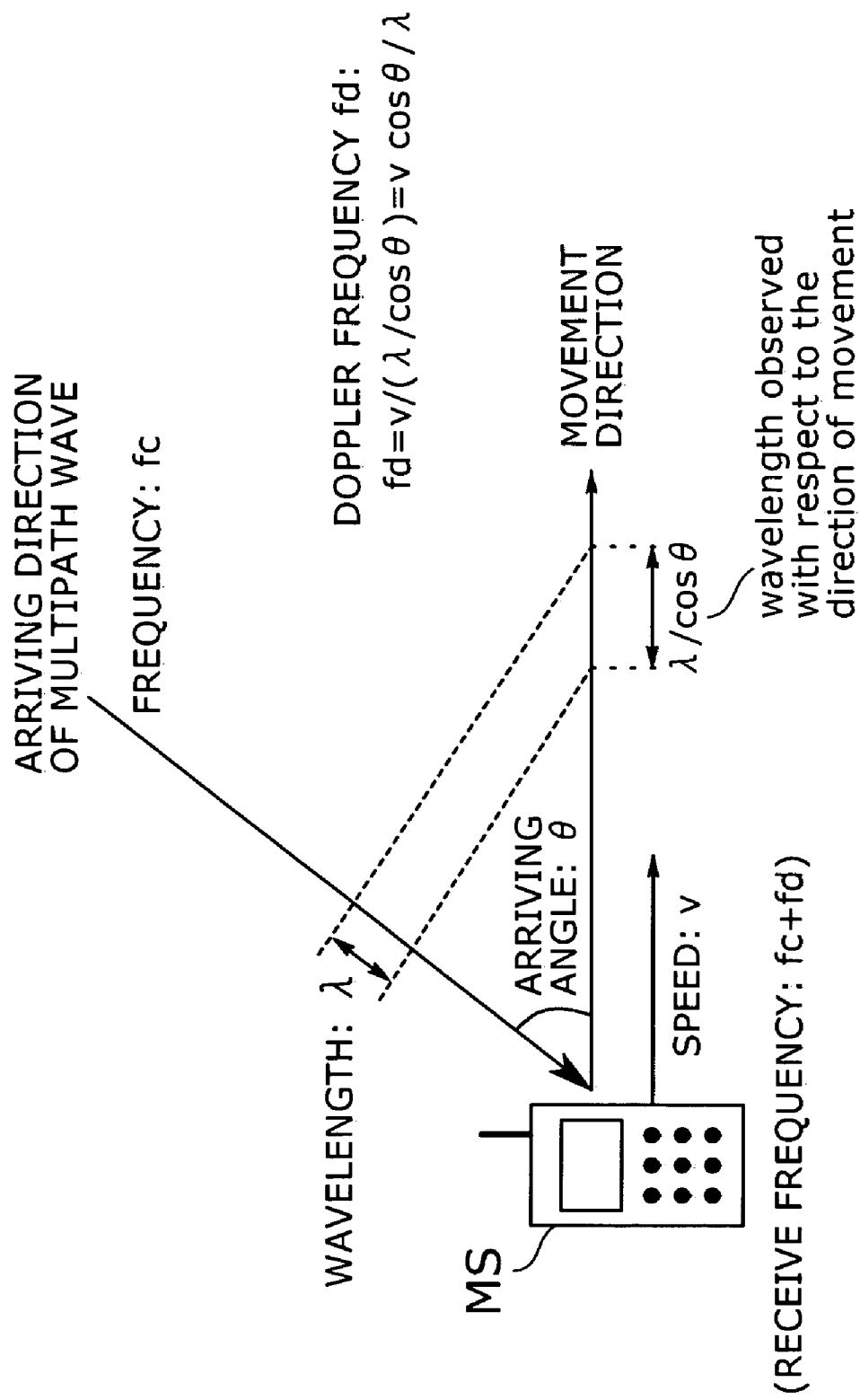
FIG. 2 explains Doppler frequency.

FIG. 2 explains Doppler frequency, assuming a situation where a multipath wave component with carrier frequency fc arrives at a mobile station MS from an angle θ relative to the direction of the mobile station's motion. From the wavelength of the incoming radio wave observed with respect to the movement direction, the Doppler frequency shift (or simply, "Doppler frequency" or "Doppler shift") fd is calculated as follows:

$$fd = \frac{v}{\lambda} \cos\theta \qquad (1)$$

where v represents the motion speed of MS, λ the carrier wavelength, and θ the angle of arrival.

Figure 3A:
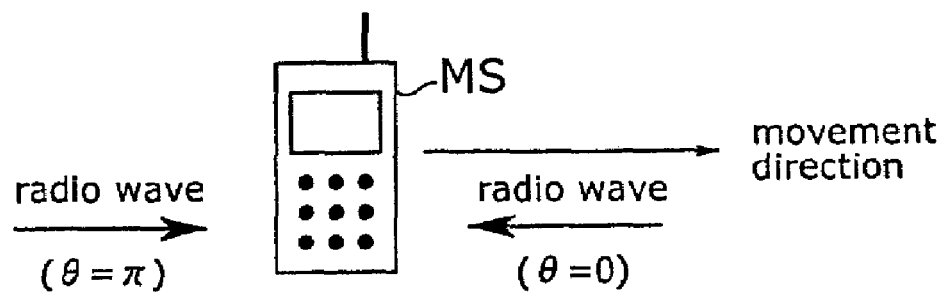
FIG. 3A shows Doppler frequency in the case where the radio waves come from the same direction as or opposite direction to the mobile station's velocity.
Figure 3B:
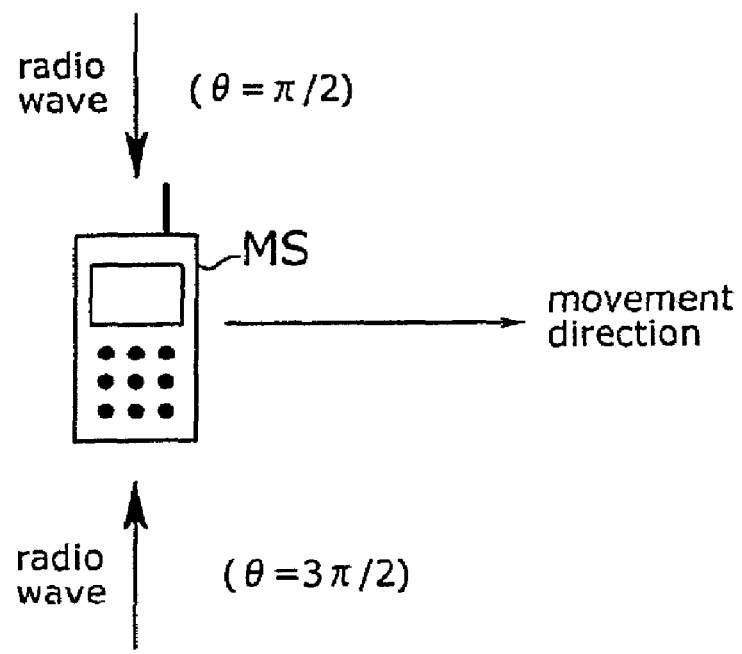
FIG. 3B shows Doppler frequency in the case where radio waves come from the direction perpendicular to the mobile station's velocity.

FIG. 3A shows Doppler frequency in the case where a radio wave comes from the same direction as (or opposite direction to) the mobile station's velocity. FIG. 3B shows Doppler frequency in the case where a radio wave comes from the direction perpendicular to the mobile station's velocity. Since in multipath environments the radio waves are supposed to arrive from almost every direction, we assume that the angles θ of arrival are distributed in the range of 360 degrees. This includes the case of θ=0 or θ=π as illustrated in FIG. 3A; i.e., the mobile station MS receives a radio wave from the same direction as or opposite direction to its motion. Equation (1) tells us that, in such conditions, the Doppler frequency fd becomes largest in absolute terms. This is called the "maximum Doppler frequency," $f_{d,max}$, which is given by the following.

$$f_{d,\max} = \frac{v}{\lambda} \qquad (2)$$

When, on the other hand, radio waves arrive from the direction of θ=π/2 or 3π/2 (i.e., perpendicular to the movement direction of MS), no Doppler shift occurs to the waves; i.e., fd=0. This is because the mobile station MS does not move in the direction that the radio wave comes from.

Figure 4A:
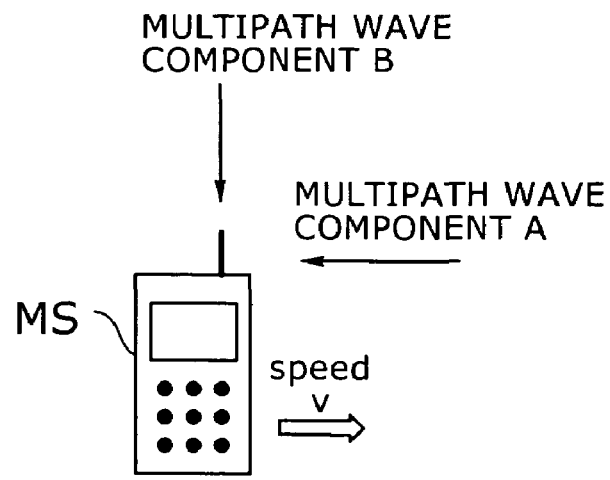
FIG. 4A shows a situation where the mobile station receives multipath wave components coming from different directions.
Figure 4B:
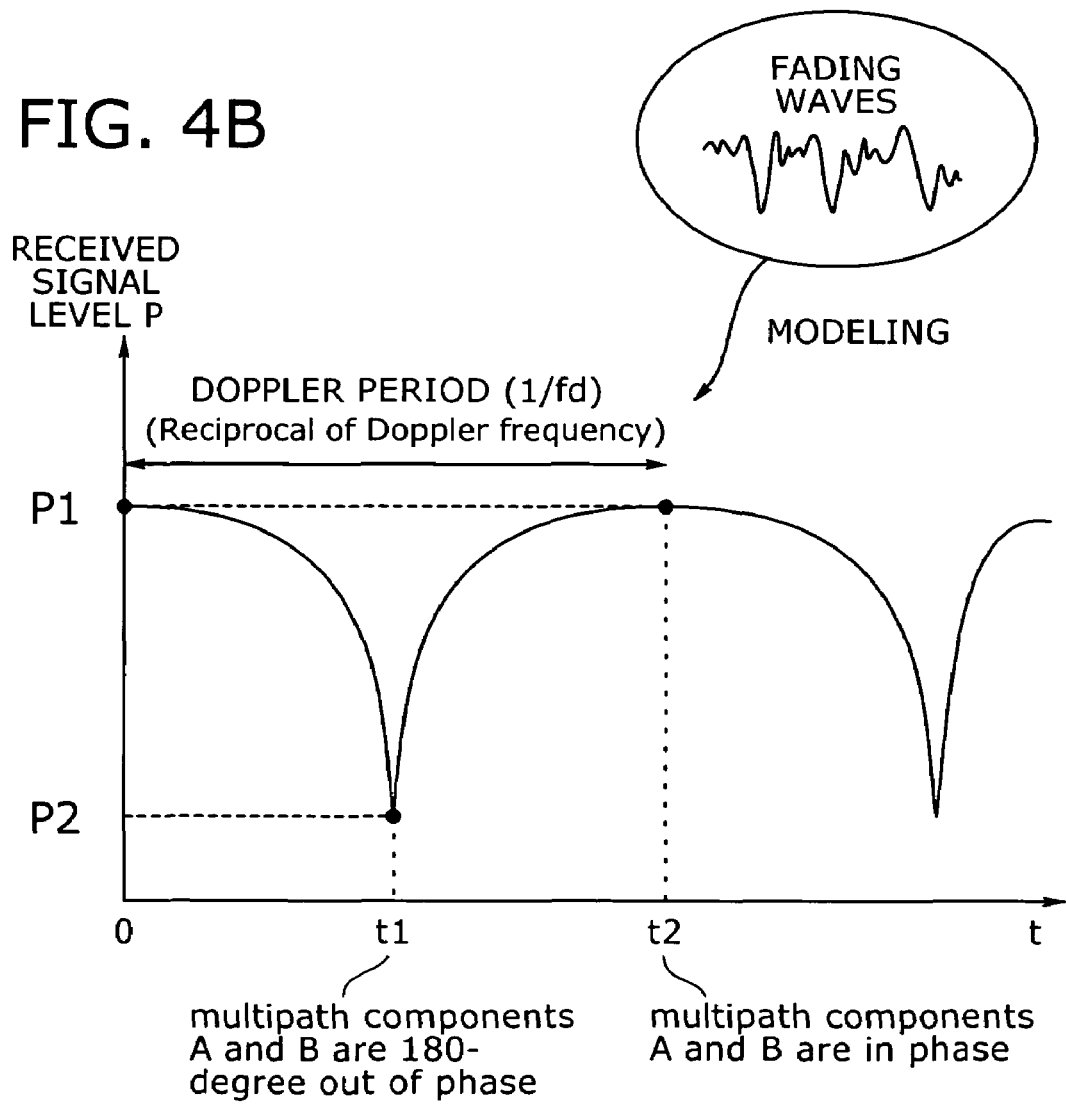
FIG. 4B shows how the reception level varies with time in the situation shown in FIG. 4A.

FIGS. 4A and 4B schematically show fading fluctuations due to Doppler effect. More specifically, FIG. 4A shows a situation where the mobile station MS receives multipath wave components coming from different directions, and FIG. 4B illustrates how the level of received radio wave signals varies with time, where the horizontal axis represents time and the vertical axis represents the received signal level. This model gives a simplified representation of fading-impaired radio waves, the level of which fluctuates as the mobile station MS moves.

Referring to FIG. 4A, the mobile station MS receives from the opposite direction to its velocity a multipath wave component A with a Doppler-shifted frequency of fc+fd (fc: carrier frequency, fd: Doppler frequency) and a phase of $\theta_A$. It also receives another multipath component B from the perpendicular direction, with a frequency of fc and a phase of $\theta_B$. Since $\theta_A$ is 2π(fc+fd)·t and $\theta_B$ is 2πfc·t, the phase difference between the two multipath components A and B is calculated as $\Delta\theta=\theta_A-\theta_B=2\pi\cdot\text{fd}\cdot\text{t}$. This formula suggests that the phase difference $\Delta\theta$ varies as the mobile station MS moves.

Referring to FIG. 4B, the received signal level drops at time point t1 and exhibits a peak at time point t2. As can be seen from the discussion in FIG. 3A, the time point t1 is when the two multipath components A and B are 180-degree out of phase, whereas the time point t2 is when they are in phase. The time interval between 0 to t2 equals Doppler period, i.e., the reciprocal of Doppler frequency. In this sense, Doppler frequency is also called "fading frequency," and Doppler period "fading period."

Doppler shift causes a variation of fading levels in the way described above, not only with downstream links (i.e., at mobile station receivers) but also with upstream links (i.e., at base station receivers). The drop of electric field intensity, as in the maximum fading effect at time point t1 in FIG. 4B, is particularly problematic because it increases data transmission errors in wireless communications. If the Doppler frequency can be estimated accurately, it will bring a substantial performance improvement to a radio communications system, because the system will be able to use a different communication technique or optimize the signal reception algorithm, depending on the Doppler period that is estimated.

The above discussion leads to the idea of an adaptive modulation system which changes modulation methods according to the actual radio propagation environment. Specifically, the adaptive system may increase the transmission rate by using, for example, a multilevel modulation technique such as 16-quadrature amplitude modulation (QAM) or 64QAM in the case of a low Doppler frequency. This approach is to enhance the data bandwidth as much as possible in the environment that has small fading variations and good channel characteristics. By contrast, the system may choose a binary phase shift keying (BPSK) technique or quadrature phase shift keying (QPSK) technique when the Doppler frequency is high. The use of such fading-resilient modulation methods permits the system to send data more reliably, while reducing the transmission rate and thus sacrificing the data transfer performance.

Figure 5:
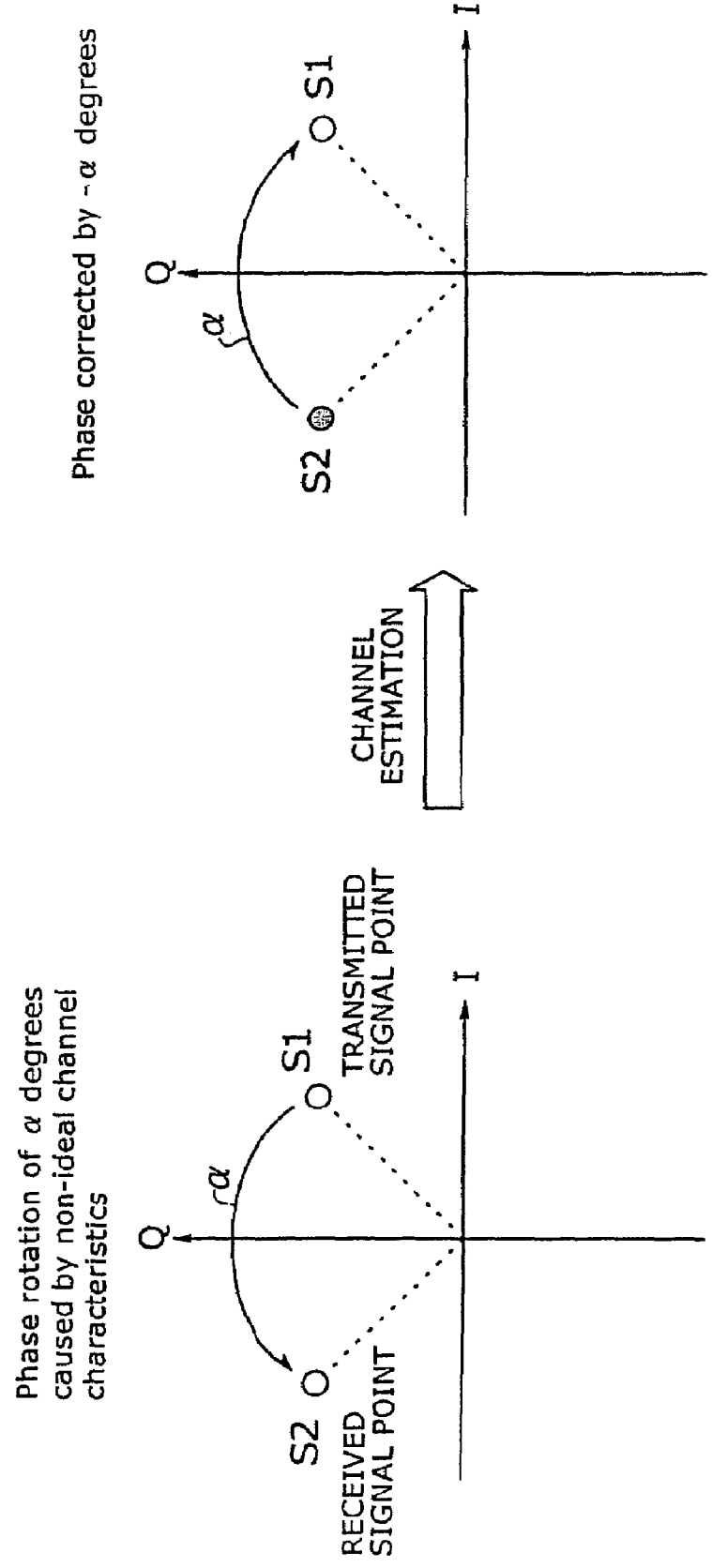
FIG. 5 provides an overview of channel estimation.

Accuracy of Doppler frequency estimation is important also in the synchronous detection, the performance of which depends on the result of channel estimation using pilot symbols. FIG. 5 provides an overview of channel estimation. In a fading environment, the received signal fluctuates not only in the amplitude but also in the phase. Suppose, for example, that a QPSK symbol is transmitted over a fading channel. While the transmitted symbol is at a signal point S1 in the I-Q plane, the fading channel causes a phase rotation of $\alpha$ degrees before the signal arrives at the receiving end. As result, the received symbol is observed at a different signal point S2, and without correction, it would be demodulated mistakenly as a different symbol. The receiving end has therefore to identify the channel variation, i.e., how much phase rotation the incoming signal is currently suffering due to the fading effect on the radio channel, and then to make an appropriate compensation for that phase rotation. In the present example of FIG. 5, the receiving end corrects the phase by $-\alpha$ degrees to reproduce the original symbol.

To allow the receiver to perform channel estimation, the transmitter regularly sends a reference signal called "pilot symbols" with a constant phase. Actually, pilot symbols are multiplexed in the transmission signal stream. With the knowledge of the original phase of pilot symbols, the receiver extracts them from a received signal and estimates the amount of fading-induced phase rotation at the moment.

The estimated channel parameters are used in synchronous detection of other received symbols, which enables the receiver to reproduce the original signals correctly.

In actual implementations, the channel estimator looks into the average behavior of many instances of pilot symbols, as opposed to relying on a single pilot symbol, because it is necessary to consider the presence of noises on the channel being observed. While a longer averaging interval may be desirable in terms of minimizing the effect of noises, it would not work well in an environment with a fast and large fading fluctuation. This is because a long averaging interval tends to involve dissimilar symbols with larger fluctuations, which leads to a greater estimation error.

To ensure the optimal signal reception, the channel estimator has to employ an adaptive method in determining the averaging interval. Specifically, the averaging interval is extended when a lower Doppler frequency is observed, so that the channel estimator can work more accurately. When a higher Doppler frequency is observed, the channel estimator shortens the averaging interval to prevent the estimation accuracy from being degraded by the fast fluctuations of fading characteristics.

Measurement of Level Crossing Rate

Among the existing algorithms of Doppler frequency estimation, one approach is based on the measurement of distance between adjacent peaks or drops in the received signal level. We will now explain this technique (referred to herein as the "first existing algorithm"), including its shortcomings.

Figure 6:
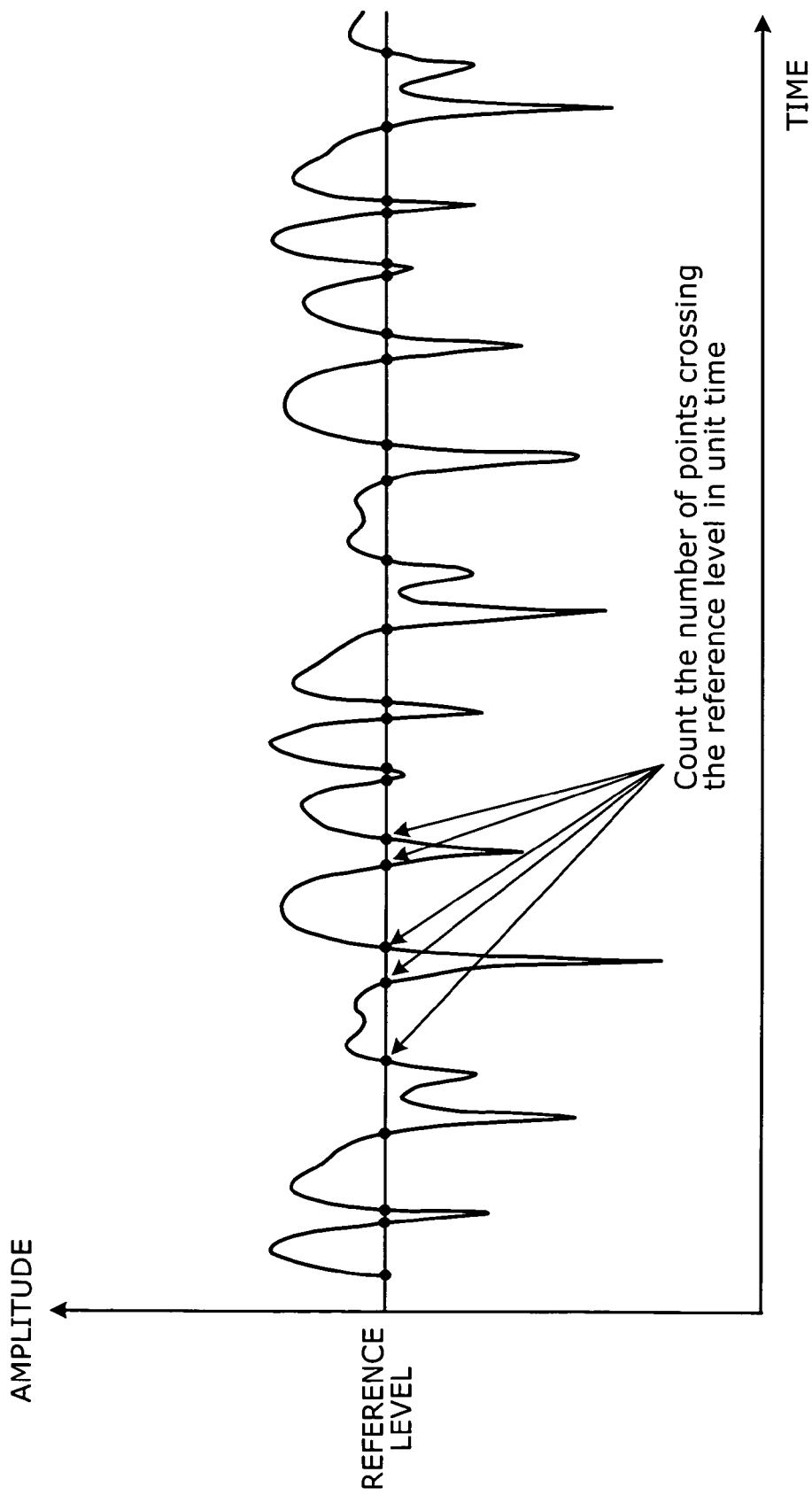
FIG. 6 illustrates the measurement of intervals of signal level variation that is caused by Doppler effects.

FIG. 6 illustrates the measurement of intervals of signal level variation that is caused by Doppler effects. According to the first existing algorithm, the amplitude of a received signal is compared with a predetermined reference level to count the number of points at which the amplitude curve crosses that reference line. The resulting count value, called "level crossing rate" (LCR), gives an estimate of the fading frequency.

The first existing algorithm requires the receiver to measure the variation of electrical field intensity continuously. To this end, the averaging of received signal levels should be repeated at short intervals, which, on the other hand, makes it difficult to accurately estimate a high fading frequency. Also, it is not easy to translate a given level crossing rate to an actual fading rate, since the behavior of multipath fading becomes more and more complicated as the number of propagation paths increases. In addition to the above, the LCR-based estimation is quite sensitive to the selection of its reference level. This could be a negative factor to accuracy and stability of estimates in such a system environment where the receiver experiences a large-scale fluctuation of average signal levels due to shadowing effects (described below).

Figure 7A:
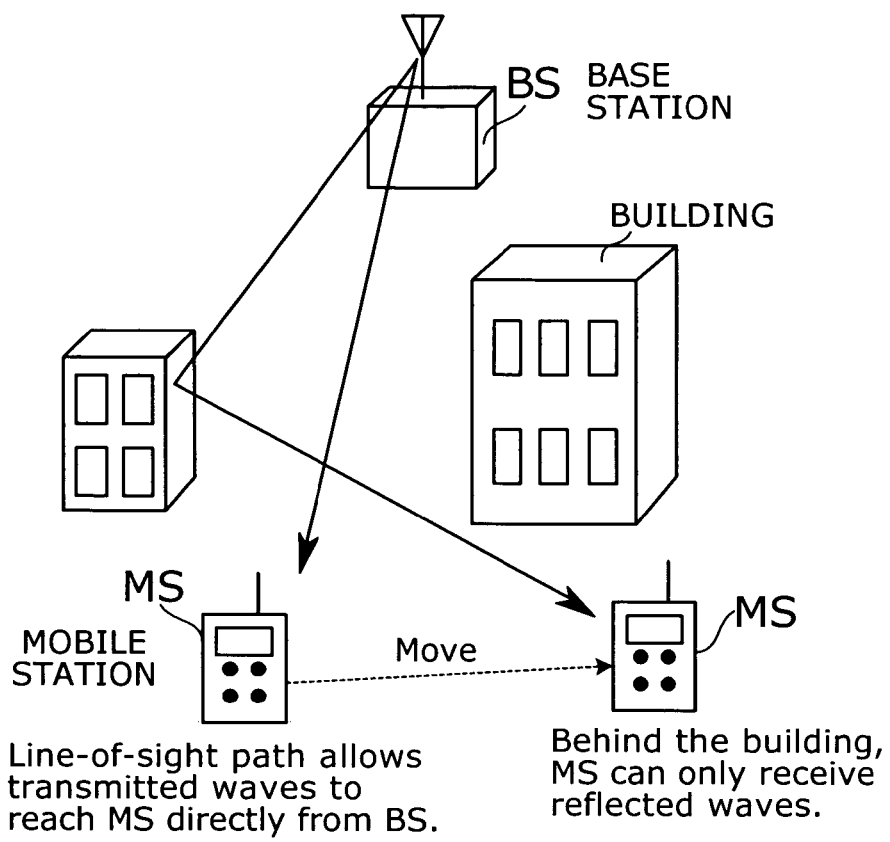
FIG. 7A illustrates an environment where shadowing occurs.
Figure 7B:
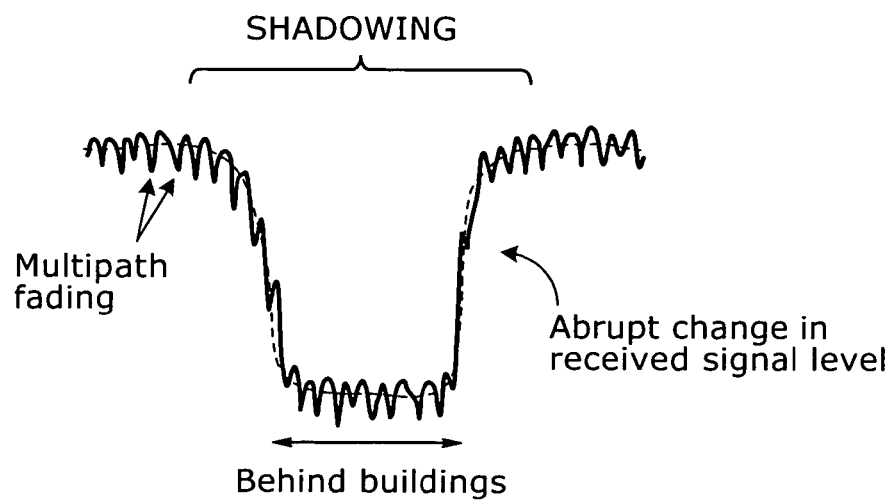
FIG. 7B shows variations of the signal reception level due to shadowing effects.

FIG. 7A illustrates a situation where shadowing occurs, and FIG. 7B shows variations of the signal reception level due to shadowing effects. The term "shadowing" refers to a long-term fluctuation of signals (as opposed to multipath fading, which is short-term fluctuations) which occurs when a line-of-sight propagation path is impaired by an obstacle for the duration of, for example, a few seconds to several tens of seconds.

As FIG. 7A shows, the mobile station MS can initially receive a radio wave from the sending base station BS through a direct line-of-sight path. However, as the mobile station MS moves into the shadow of a building, the line-of-sight propagation path is lost and only reflected waves can reach there. In such an environment, the mobile station MS experiences a significant drop of received signal level as a result of the shadowing effect as illustrated in FIG. 7B. The shadowing degrades the accuracy of the first existing algorithm, which measures the level crossing rate with respect to a fixed reference level. That is, the Doppler frequency estimated with this technique fluctuates significantly when the mobile station MS encounters shadowing.

Phase Difference Measurement

There is another existing algorithm of Doppler frequency estimation, which is based on the measurement of difference in the phases of channel estimates between adjacent frame intervals. We will now explain this technique (referred to herein as the "second existing algorithm"), including its shortcomings.

Figure 8:
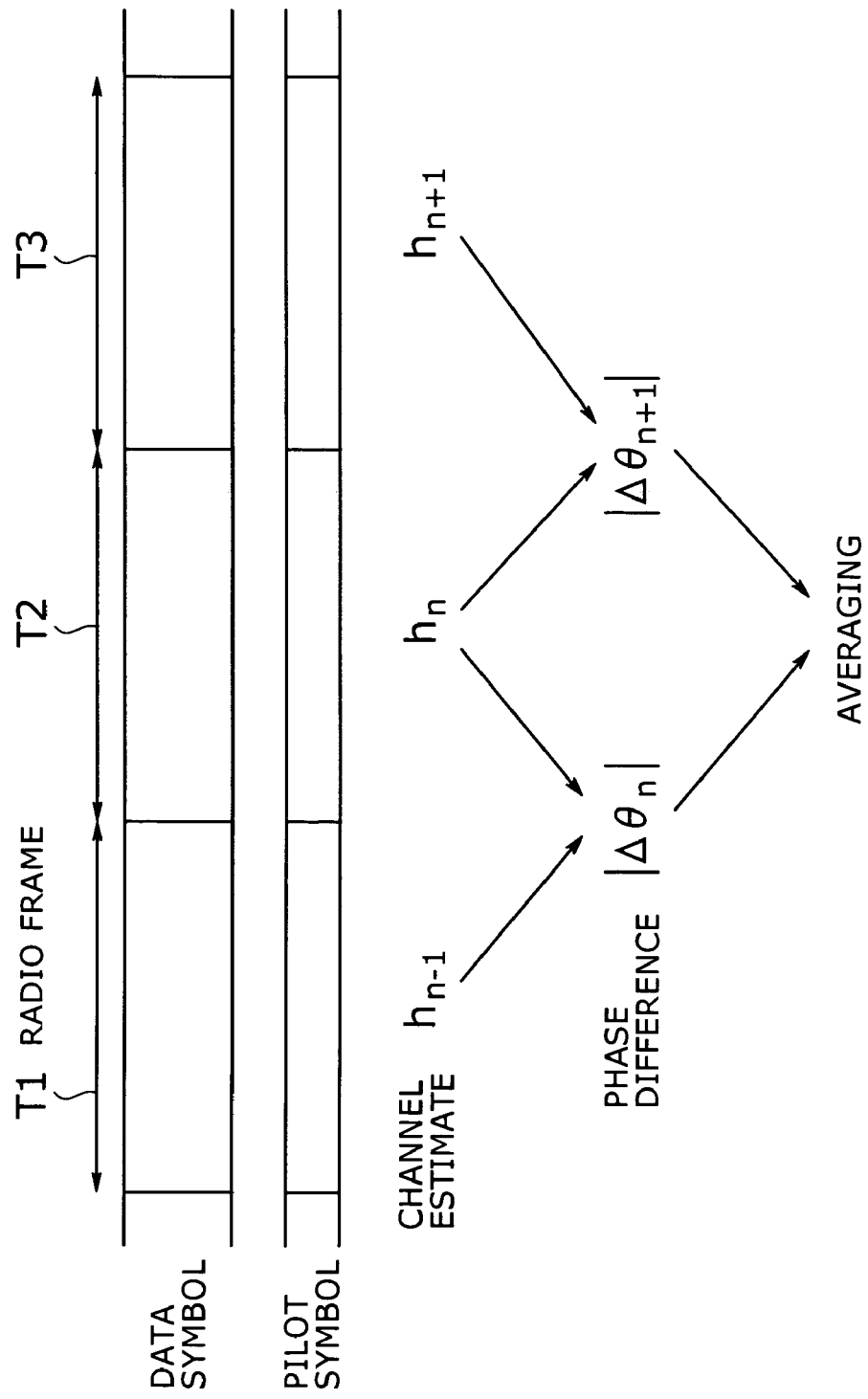
FIG. 8 shows the concept of measurement of phase differences between channel estimates.

FIG. 8 shows the concept of measurement of phase differences between channel estimates. The second existing algorithm estimates Doppler frequency by calculating a channel estimate frame by frame and then averaging the phase differences between the resultant channel estimates in absolute terms over a plurality of frames. In the example of FIG. 8, the algorithm calculates a channel estimate $h_{n-1}$ for the (n−1)th frame by averaging a plurality of pilot symbols contained in frame T1. Likewise, it calculates a channel estimate $h_n$ for the nth frame by averaging pilot symbols in frame T2, and then calculates a channel estimate $h_{n+1}$ for the (n+1)th frame by averaging pilot symbols in frame T3, thus investigating how much phase rotation the pilot symbols receive in each frame. Subsequently the algorithm calculates the phase difference $\Delta\theta n$ between channel estimates as follows:

$$\Delta\theta n = \angle h_n - \angle h_{n-1} \qquad (3)$$

$$= \tan^{-1}\left(\frac{\mathrm{Im}\{h_n\}}{\mathrm{Re}\{h_n\}}\right) - \tan^{-1}\left(\frac{\mathrm{Im}\{h_{n-1}\}}{\mathrm{Re}\{h_{n-1}\}}\right)$$

The phase difference $\Delta\theta n$ calculated in this way contains two kinds of components: a phase variation due to fading and a phase change due to frequency offset (carrier offset).

The term "frequency offset" refers to the difference between transmitter frequency and receiver frequency. In a 2-GHz band W-CDMA system, for example, the base station generates a carrier frequency of 2 GHz, as do the mobile stations. Those locally produced 2-GHz clock signals are, however, not identical in the strict sense. For example, the base station may generate 2.00001 GHz whereas a mobile station generates 1.9999 GHz. There is always a difference in the frequency (i.e., frequency offset) between the sending end and receiving end, which could cause a phase rotation of transmitted signals, as the multipath fading does. Because of this frequency offset, mobile stations may experience a frequency offset-induced phase variation even in a fading-free environment.

As equation (1) suggests, fading-induced phase variations tend to change their directions. For example, the phase could rotate as follows: +10°, +10°, −10°, −10°, −10°, and so on. In contrast to this, frequency offset-induced phase variations are unidirectional. With a frequency offset of, for example, 80 Hz, the phase rotates at the constant rate corresponding to that frequency. To average the phase differences $\Delta\theta n$ as vector components is to average their frequency offset-induced components only, and the averaged result does not reflect their fading-induced components. This is because, as mentioned above, fading-induced components tend to change signs (e.g., +10°, +10°, −10°, −10°, −10°, . . . ), and their average is supposed to converge to zero over time. On the other hand, frequency offset-induced phase variations tend to repeat the same pattern at unit time intervals (e.g., +10°, +10°, . . . ), and thus their mean value is not zero. To include fading-induced components in the average, scalar averaging should be implemented; in this case, the process has to average the absolute values of phase differences $\Delta\theta n$ given by equation (3).

As an alternative method to estimate Doppler frequency, the following equation (4) can replace the preceding equation (3).

$$|\Delta\theta n| = \cos^{-1}\left(\frac{h_n \cdot h_{n-1}}{|h_n| \cdot |h_{n-1}|}\right) \qquad (4)$$

This equation (4) directly yields an absolute phase difference from the inner product of two consecutive channel estimates. By averaging these $|\Delta\theta n|$ and dividing the resulting mean value by the frame interval, an estimate of the phase rotation rate is obtained in units of radians per second. This value is now translated into Doppler frequency as follows:

$$fd = \frac{|\overline{\Delta\theta n}|}{2\pi T} = \frac{1}{2\pi TN}\sum_{n=0}^{N-1}|\Delta\theta_n| \qquad (5)$$

where N denotes the number of frames in an averaging interval, and T represents the frame interval.

The second existing algorithm described above is, however, unable to cancel noise components, but allows such components to exert an influence on the result, because the algorithm averages phase differences in absolute terms. As with the fading-induced variations, noise components tend to show random phase rotations over time, and the scalar averaging cannot eliminate such components, unlike vector averaging. For this reason, the calculated Doppler frequency estimate is significantly affected by the noise components. With signals received in a noisy radio channel environment, the estimation often yields an inaccurate Doppler frequency that is greater than the actual value.

Today's radio communications systems take advantage of diversity reception and error correction techniques to provide better performance even in low S/N conditions. They also have transmission power control functions to guarantee the required quality level of communications with minimum energy consumption and thus to provide longer talk time. For those reasons, the S/N ratio of received radio signals is not high in general, and it is hard to estimate Doppler frequency at high accuracy in such radio environments. The present invention is intended to address the shortcomings of the above-described conventional techniques, and to provide a communications device with an enhanced performance of Doppler frequency estimation that can work accurately even in low S/N conditions.

First Embodiment

Figure 9:
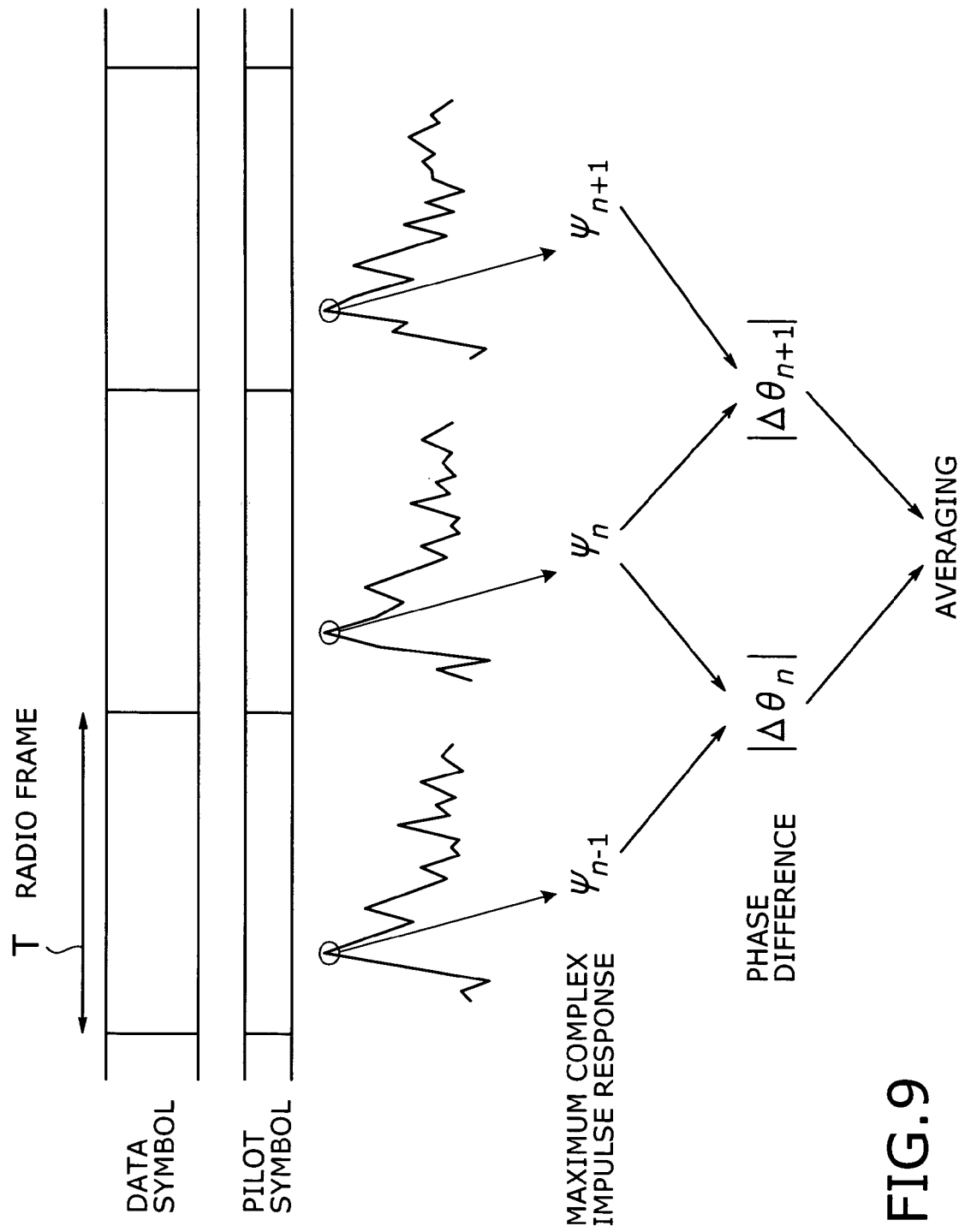
FIG. 9 shows the concept of Doppler frequency estimation according to the present invention.

This section describes in detail the operation of the foregoing communications device 10, which estimates Doppler frequency according to the method of the present invention. Shown in FIG. 9 is the concept of Doppler frequency estimation according to a first embodiment of the invention. As can be seen from the diagram, the communications device 10 first calculates a series of complex impulse responses from a signal received in each radio frame interval T. Of all responses within a frame T, it finds a maximum complex impulse response, i.e., the complex impulse response with a maximum magnitude. In this way, the communications device 10 obtains a maximum complex impulse response for each radio frame T, as well as identifies the phase of that response. It subsequently calculates absolute phase differences between adjacent frames and then averages them over a plurality of radio frames, thus obtaining an estimate of Doppler frequency.

Complex impulse responses are calculated from some signals with known properties, such as pilot symbols (synchronous channel signals, which the base station transmits continuously, can also serve the purpose). More specifically, the communications device 10 produces a local replica of such a known signal for use in calculating the correlation between a received signal and the replica. The resulting cross-correlation represents complex impulse responses.

Figure 10A:
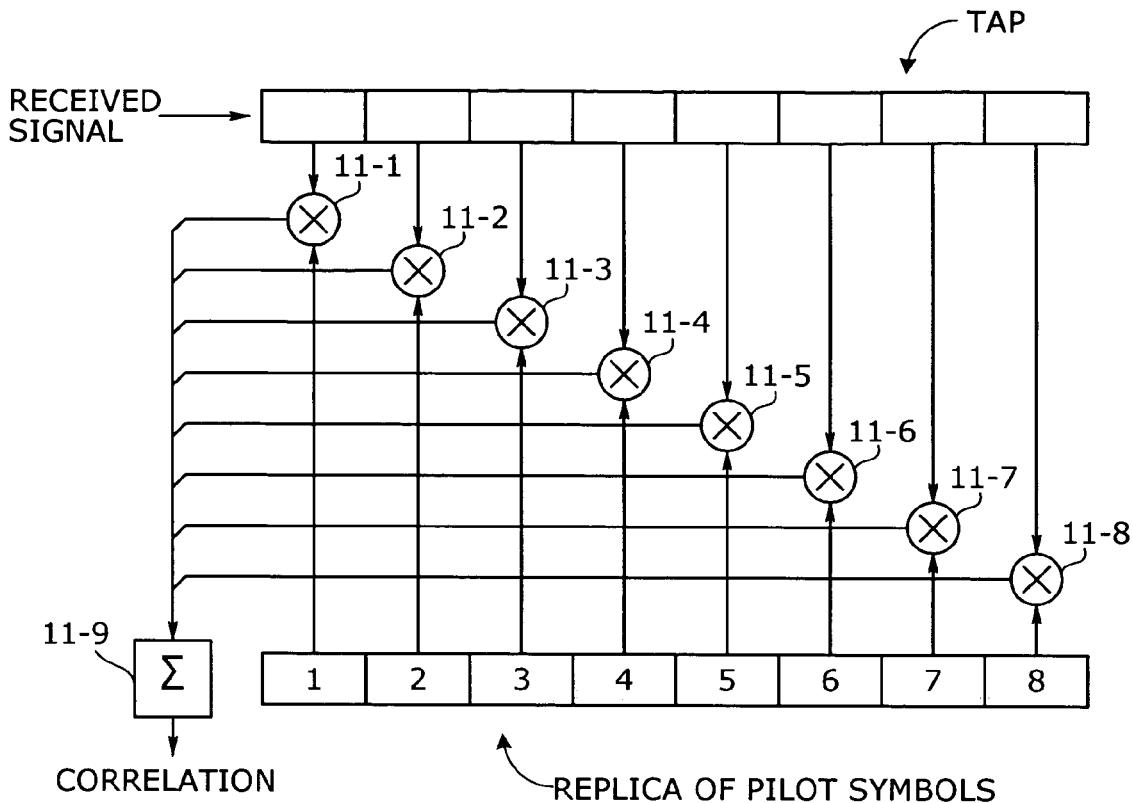
FIGS. 10A and 10B provide an overview of how a complex impulse response measurement unit works.
Figure 10B:
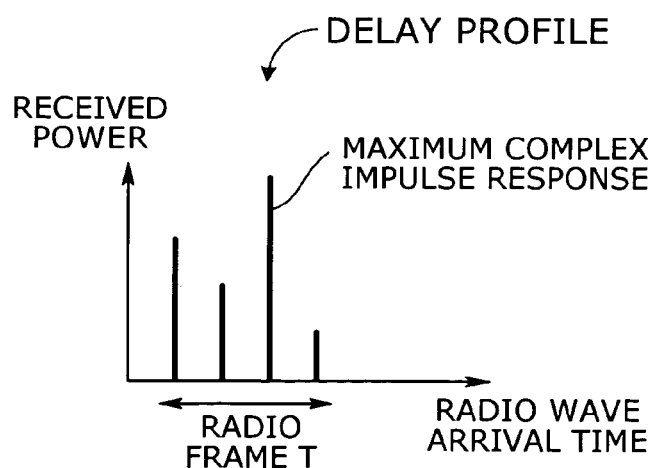

FIGS. 10A and 10B provide an overview of how the complex impulse response measurement unit 11 works (note that the complex time-domain response measurement unit 11 in FIG. 1 is renamed as such). Referring to FIG. 10A, the complex impulse response measurement unit 11 has a plurality of multipliers 11-1 to 11-8 and an adder 11-9 to calculate the cross-correlation between a received signal sequence and a pilot symbol sequence (which is a replica of pilot symbols). The received signal sequence contains pilot symbols, and thus the calculated cross-correlation exhibits a peak, or an impulse, at the time point where the received signal matches with the replica. Since the received signal consists of a plurality of multipath components, the earliest wave produces a first impulse in the cross-correlation, the next coming wave produces a second impulse, and this continues until all multipath waves appear. The process brings both a delay profile (see FIG. 10B) and complex impulse responses.

We define the complex impulse response as follows. Let $S_k$ (k=0 to K-1) be a pilot symbol sequence (or its replica) contained in a radio frame, and $R_n(i)$ be a received signal in the nth frame, where i is a variable indicating a time position. The complex impulse response $\Psi_n(i)$ is then given by $$\Psi_n(i) = \sum_{k=0}^{K-1} R_n(i+k) \cdot S_k^* \qquad (6)$$

where * denotes the complex conjugate, and the variables i and k represent sample timings in transmission and reception. The temporal resolution of complex impulse response is defined as the reciprocal of the sampling rate. Since radio communications systems typically use four-fold to eight-fold oversampling, the resolution of impulse response measurement is four times to eight times as high as the symbol rate.

The complex impulse response measurement unit 11 passes $\Psi_n(i)$ to the phase difference calculator 12, which finds a maximum complex impulse response $\Psi n$ in each individual frame n and then calculates absolute phase differences as follows:

$$|\Delta\theta n| = \cos^{-1}\left(\frac{\Psi_n \cdot \Psi_{n-1}}{|\Psi_n| \cdot |\Psi_{n-1}|}\right) \qquad (7)$$

Subsequently, $|\Delta\theta n|$ is averaged over N frames, and an estimate of Doppler frequency is obtained from the resultant mean value in the way described earlier in equation (5).

Second Embodiment

In the case where the time positions of maximum complex impulse responses fluctuate at a high rate, the phase difference calculation based on equation (7) may not always be able to provide an accurate estimate of fading effects. To improve the accuracy, we propose, as a second embodiment of the present invention, a method that finds one frame's maximum complex impulse response and uses that time position in extracting the next frame's complex impulse response for phase comparison. We will now provide details of the second embodiment below, with reference to FIGS. 11 and 12.

Figure 11:
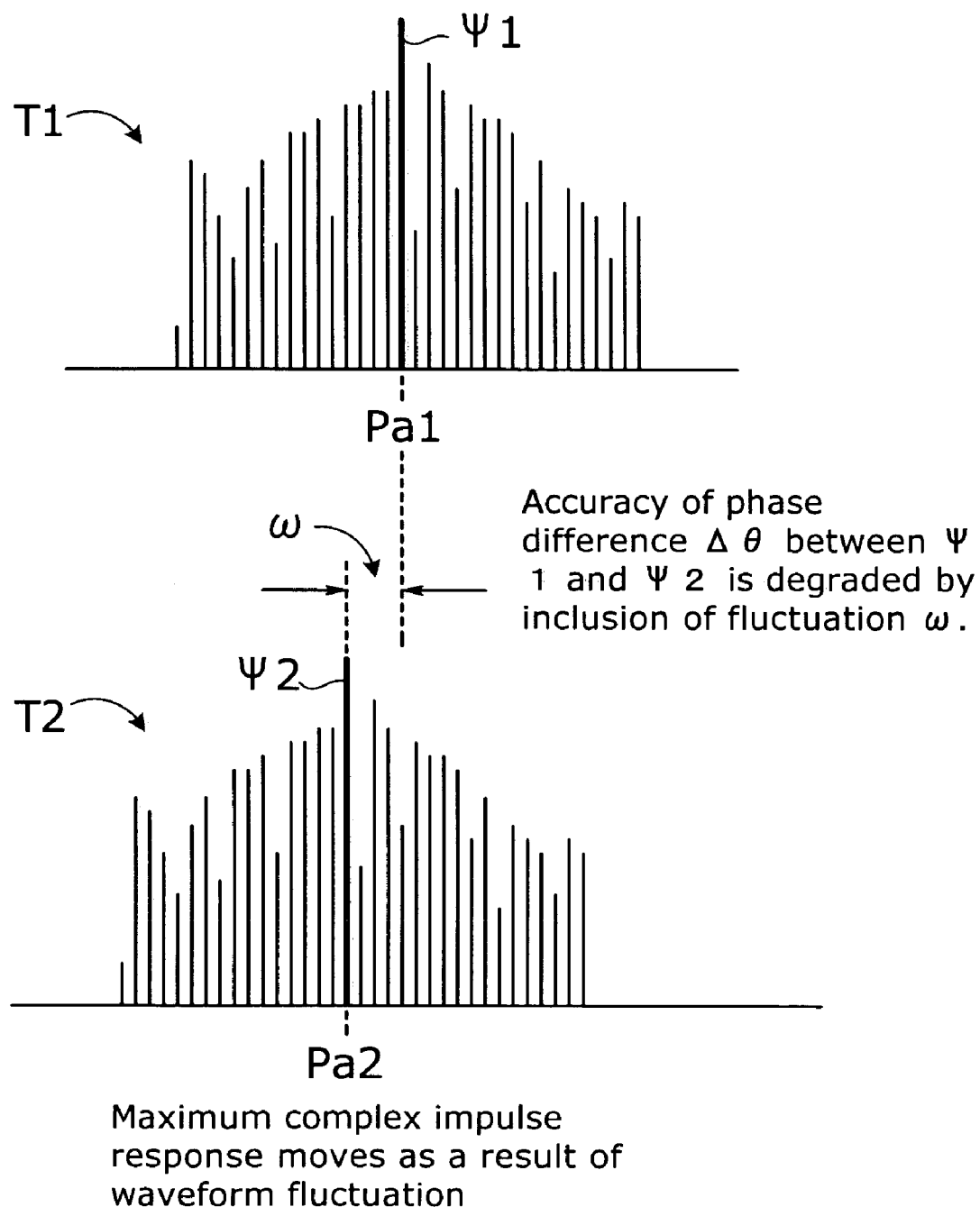
FIG. 11 shows a movement of maximum complex impulse responses.

FIG. 11 illustrates a variation of maximum complex impulse responses. The upper half of FIG. 11 shows a radio frame T1 with a maximum complex impulse response Ψ1 at point Pa1, while the lower half shows the subsequent radio frame T2 with a maximum complex impulse response Ψ2 at point Pa2. As can be seen, the peak time position has moved from Pa1 to Pa2 in a single frame period. This displacement is so quick and large that it introduces extraneous variations into the calculated phase difference Δθ between Ψ1 and Ψ2, which results in an increased estimation error.

Figure 12:
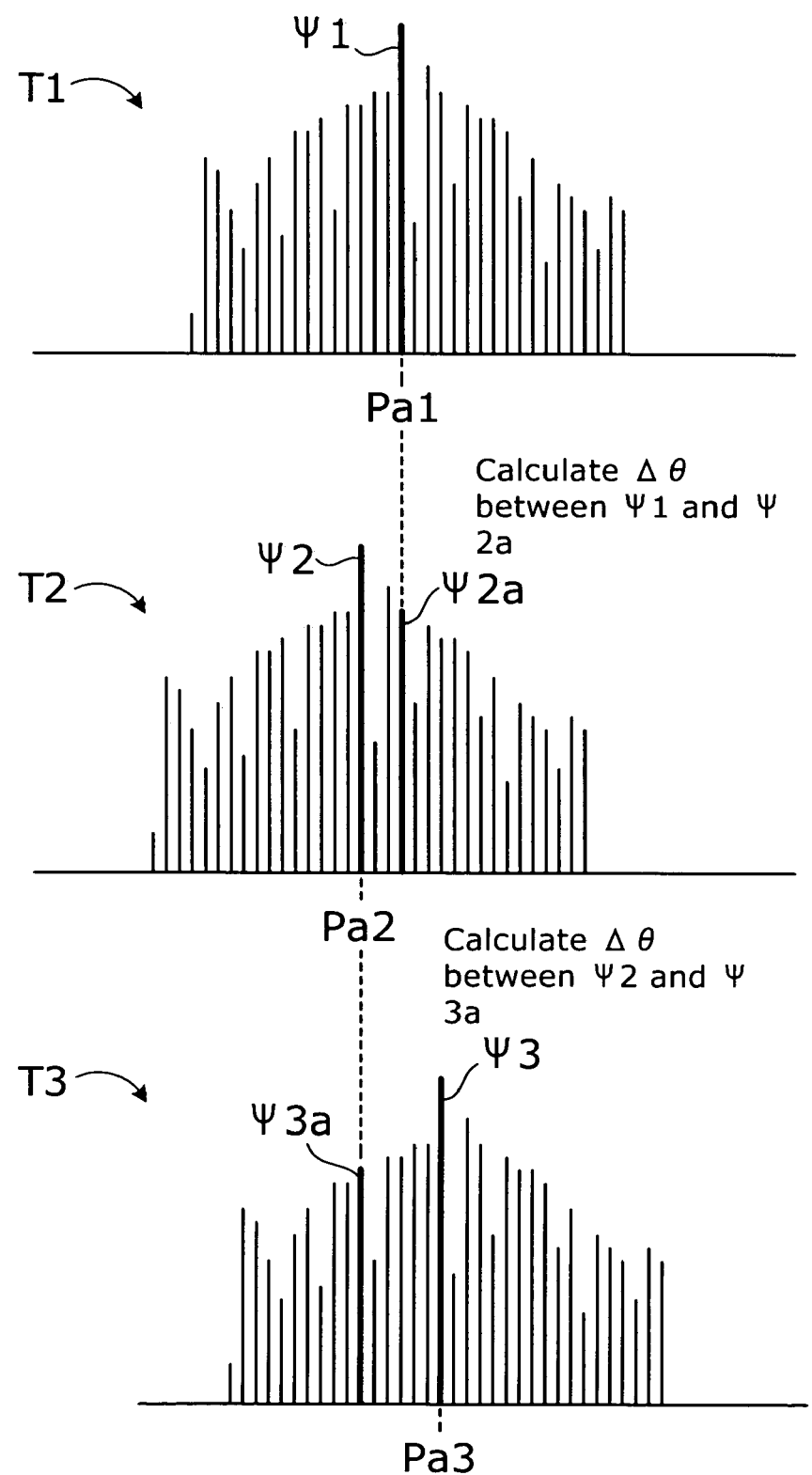
FIG. 12 shows a second embodiment of the present invention that provides an alternative way to calculate phase differences between complex impulse responses in two consecutive frames.

FIG. 12 shows an alternative way to calculate the phase difference between complex impulse responses in two consecutive frames. The topmost part of FIG. 12 shows a radio frame T1 with a maximum complex impulse response Ψ1 observed at point Pa1. The middle part shows the next radio frame T2 with a maximum complex impulse response Ψ2 at point Pa2. The bottommost part shows the subsequent radio frame T3 with a maximum complex impulse response Ψ3 at point Pa3. The alternative method first calculates the phase difference between the maximum complex impulse response Ψ1 in the first radio frame T1 and a complex impulse response Ψ2a located at the corresponding position Pa1 (i.e., at the same position as the maximum complex impulse response Ψ1) in the second radio frame T2. It then calculates the phase difference between the maximum complex impulse response Ψ2 in the second radio frame T2 and a complex impulse response Ψ3a located at the corresponding position Pa2 (i.e., at the same position as the maximum complex impulse response Ψ2) in the third radio frame T3.

As the above example shows, the alternative method finds a maximum complex impulse response of the (n−1)th frame and uses that time position t1 to extract a complex impulse response in the nth frame. Then it calculates the absolute phase difference between the (n−1)th frame's maximum complex impulse response and the nth frame's complex impulse response, both of which are located at the fixed time position t1. At the next step, the alternative method finds a maximum complex impulse response of the nth frame and uses that time position t2 to extract a complex impulse response in the (n+1)th frame. The calculation of an absolute phase difference then takes place between the nth frame's maximum complex impulse response and the (n+1)th frame's complex impulse response, both residing at the fixed time position t2. By repeating the above, the proposed method suppresses the effect of waveform displacements on the phase differences Δθ, thus alleviating accuracy degradation in the estimation.

Now let $I_n$ represent the position of the maximum complex impulse response in the nth frame. Then the following equation (8) gives the absolute phase difference in the process we have explained in FIG. 12.

$$|\Delta\theta n| = \cos^{-1}\left(\frac{\Psi_n(I_n) \cdot \Psi_{n-1}(I_n)}{|\Psi_n(I_n)| \cdot |\Psi_{n-1}(I_n)|}\right) \quad (8)$$

Subsequently the calculated |Δθn| are averaged over N frames, and the resulting mean value is translated into an estimate of Doppler frequency in the way described earlier in equation (5).

As can be seen from the above explanation, the present invention estimates the Doppler frequency based on maximum complex impulse responses found in a given series of frames. It should be noted that maximum complex impulse responses represent multipath components with the highest S/N ratios among others. This means that the proposed method selectively uses signal components with maximum S/N ratios in estimating Doppler frequency, thus preventing the estimation process from being influenced by noise components, and improving the accuracy of estimation. In addition, a raised resolution of complex impulse responses eliminates the effect of useless multipath components and shortens the averaging intervals necessary for the estimation.

Digital Receiver Applications

Figure 13:
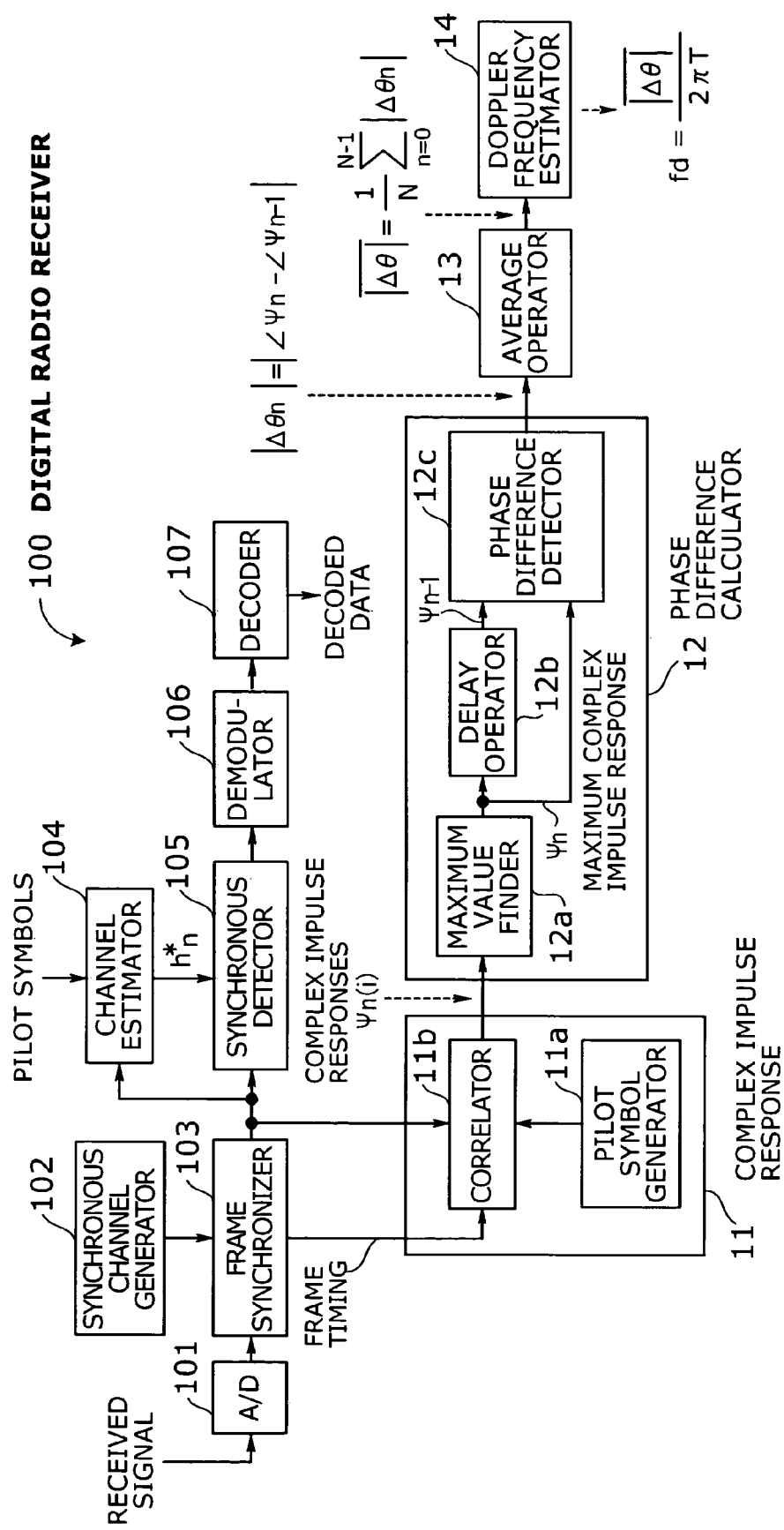
FIG. 13 shows the structure of a digital radio receiver.

This section describes a digital radio receiver to which the communications device 10 of the present invention is applied. FIG. 13 shows the structure of a digital radio receiver 100. This receiver 100 has a data reconstructing section comprising the following elements: an analog-to-digital (A/D) converter 101, a synchronous channel generator 102, a frame synchronizer 103, a channel estimator 104, a synchronous detector 105, a demodulator 106, and a decoder 107. In addition, the digital radio receiver 100 has a complex impulse response measurement unit 11, a phase difference calculator 12, an average operator 13, and a Doppler frequency estimator 14 according to the present invention. The complex impulse response measurement unit 11 contains a pilot symbol generator 11a and a correlator 11b, and the phase difference calculator 12 is composed of a maximum value finder 12a, a delay operator 12b, and a phase difference detector 12c.

A radio frequency (RF) signal received at an antenna (not shown) is supplied to the A/D converter 101, which converts the frequency of the received signal and performs orthogonal detection to split the signal into I-channel and Q-channel baseband components. The A/D converter 101 converts the each component into digital form for processing in the subsequent blocks. The synchronous channel generator 102 produces a replica of synchronous channel, which is to be used by the frame synchronizer 103 to detect frame timings (i.e., the beginning of a frame). The frame synchronizer 103 examines the A/D converted signals with reference to the synchronous channel, thus detecting the beginning of each frame contained in the signal.

The channel estimator 104 estimates channel parameters from pilot symbols in the received signal. The synchronous detector 105 performs detection to reproduce the original transmission signal, while removing the effect of multipath propagation from the received signal, according to the estimated channel parameters.

The demodulator 106 demodulates the modulated signal (e.g., QPSK or 16QAM symbols), thus reconstructing a stream of data. The data stream has been processed at the sending end with an error correction coding technique such as convolutional coding or turbo coding. The decoder 107 uses error correction code to recover lost data bits, if any.

Inside the complex impulse response measurement unit 11, the pilot symbol generator 11a produces a replica of pilot symbols after spreading (in CDMA systems) or oversampling, to increase the time resolution of complex impulse responses. The correlator 11b calculates the cross-correlation between the pilot symbol sequence and received signal, thus obtaining complex impulse responses Ψn(i) with an increased temporal resolution. Complex impulse responses represent the current channel condition with a high temporal resolution, and their mean power distribution gives us a power delay profile of the channel.

The illustrated phase difference calculator 12 is designed to implement the algorithm of the first embodiment. The maximum value finder 12a finds a peak impulse (i.e., maximum complex impulse response Ψn) out of a given set of complex impulse responses. The delay operator 12b delays the detected maximum complex impulse response Ψn by one frame. Accordingly, what appears at its output is the previous frame's maximum complex impulse response Ψn−1. The phase difference detector 12c compares the nth frame's maximum complex impulse response Ψn with the (n−1)th frame's maximum complex impulse response Ψn−1, thus calculating their absolute phase difference

|Δθn|=|∠Ψn−∠Ψn−1|.

The average operator 13 then calculates a mean phase difference by averaging such phase differences over a plurality of consecutive frames. Finally, the Doppler frequency estimator 14 translates the mean value into a Doppler frequency in units of Hz.

Third Embodiment

This section describes an estimation algorithm according to a third embodiment of the present invention, which calculates absolute phase differences between complex impulse responses at a fixed position to yield their mean value over a plurality of frames. Before going into the details of this algorithm, we will spend a few paragraphs to briefly review the first and second embodiments and provide background information on the third embodiment.

In the preceding sections we have described two embodiments with different algorithms for estimating Doppler frequency. That is, the first embodiment (FIGS. 9 and 10) is distinctive in that it averages the absolute phase differences between maximum complex impulse responses over a plurality of frames. The second embodiment (FIGS. 11 and 12) finds a maximum complex impulse response in the (n−1)th frame, uses that time position to extract a complex impulse response in the nth frame, and calculates an absolute phase difference between the (n−1)th frame's maximum complex impulse response and nth frame's complex impulse response.

Referring again to FIG. 13, the phase difference calculator 12 in the digital radio receiver 100 calculates phase differences between complex impulse responses, updating the time position of the maximum complex impulse response. This means that, in each radio frame period, the phase difference calculator 12 only watches a propagation path that is in the most excellent (or the least fading) propagation conditions. The average operator 13 calculates a mean absolute phase variation $|\Delta\theta n|$ ($=|\angle\Psi n-\angle\Psi n-1|$) of such a particular propagation path.

Generally, a radio signal in good path conditions tends to have a smaller phase fluctuation than a signal in a deep fade has. If the estimation is made only on the basis of less-faded signal components as in the systems mentioned above, the resulting estimate of Doppler frequency could be lower than the actual frequency. That is, the estimation could yield a lower Doppler frequency estimate, even though the real radio environment gives a larger shift to signal components. This fact suggests that the averaging process has also to take into account the phase variations of some fading-impaired signal components.

For the above reason, the third embodiment of the present invention offers the following method in averaging phase variations over multiple radio frames. The estimation algorithm finds a maximum complex impulse response at the beginning, and it uses that time position of the maximum complex impulse response in extracting complex impulse responses in subsequent radio frames. That is, the algorithm calculates the absolute differences between consecutive frames by comparing their respective complex impulse responses at the same fixed time position determined at the beginning. This method involves not only the maximum complex impulse response that represents a signal in a good path condition, but also other part of complex impulse responses that may represent signals in a deep fade. Phase variations of fading-impaired signal components can thus be included in the averaging process to some extent, resulting in a better estimate of Doppler frequency.

Figure 14:
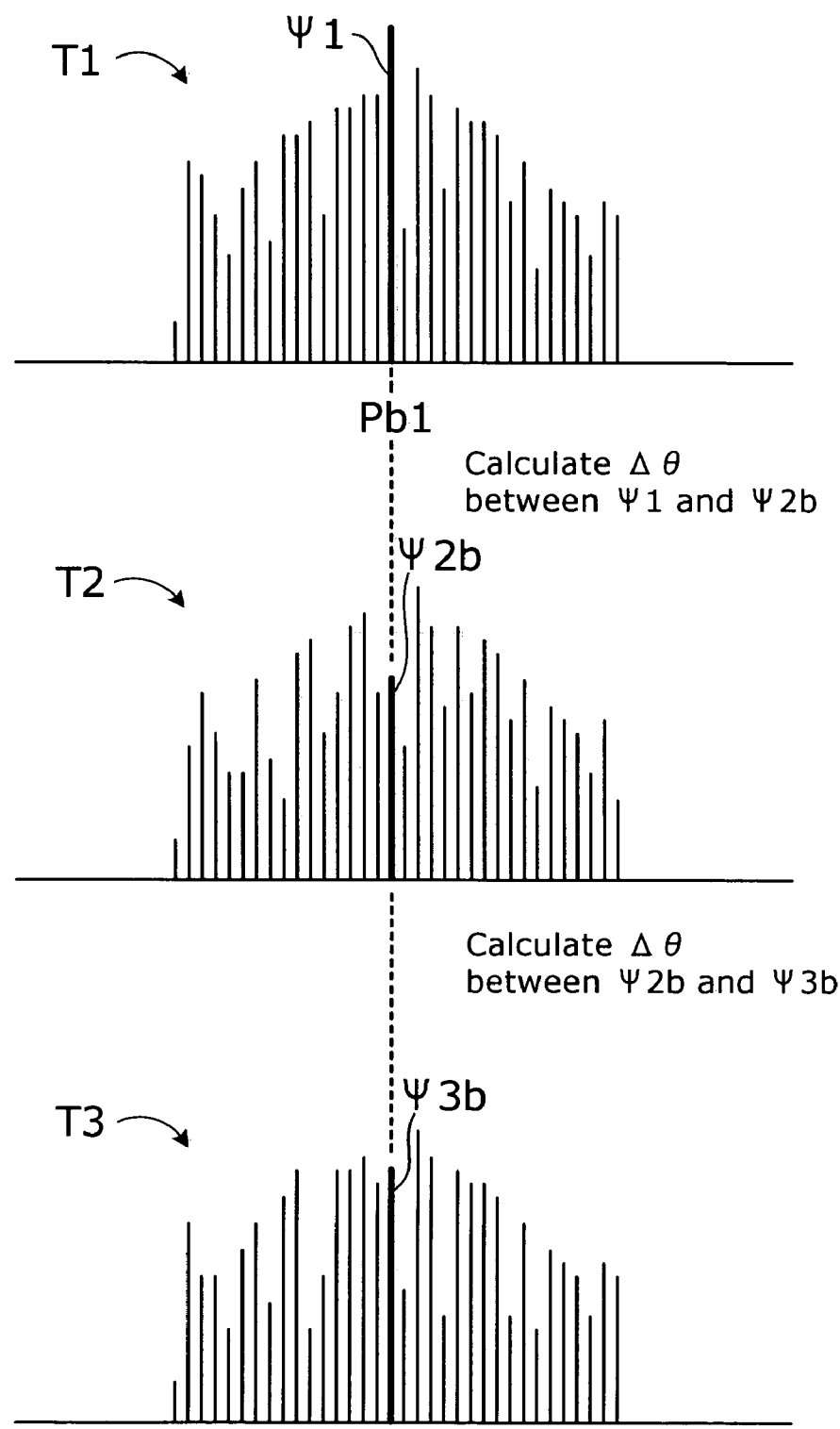
FIG. 14 shows a third embodiment of the present invention that calculates phase differences between complex impulse responses at a fixed time position in consecutive frames.
Figure 15A:
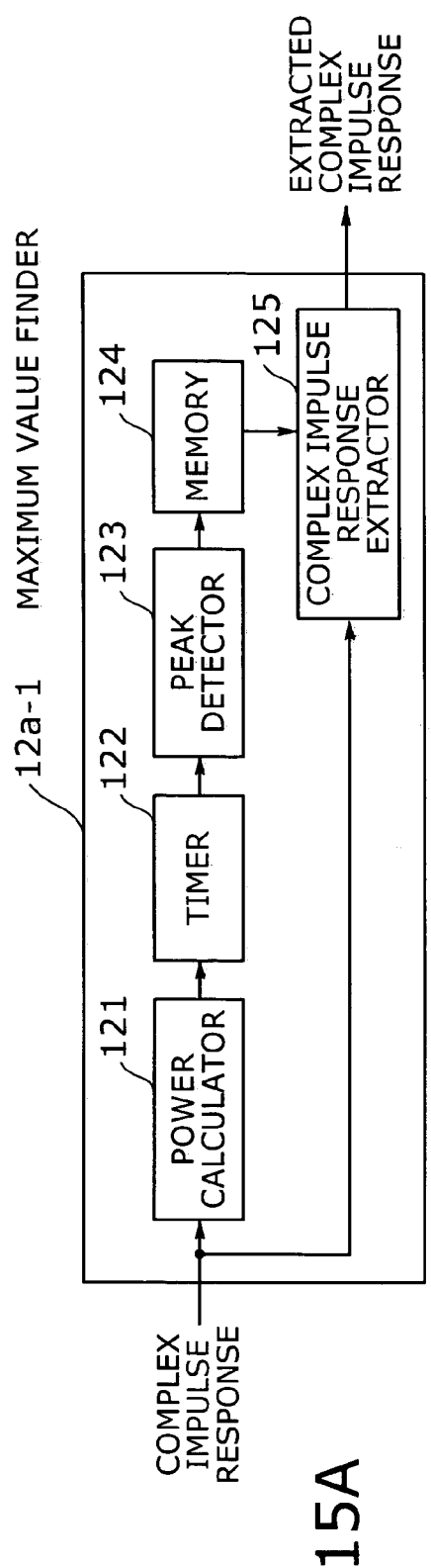
FIG. 15A shows the structure of a maximum value finder for use in a third embodiment of the present invention.

FIG. 14 shows how to calculate phase differences between complex impulse responses at a fixed time position in consecutive frames. Suppose now that a maximum complex impulse response $\Psi 1$ is found at the position Pb1 in the first frame T1. In the second frame T2, a complex impulse response $\Psi 2b$ located at the same position Pb1 is extracted, and similarly in the third frame T3, a complex impulse response $\Psi 3b$ is extracted from the position Pb1. The estimation algorithm repeats the same for other frames that follow. It calculates now the absolute phase difference between the maximum complex impulse response $\Psi 1$ and complex impulse response $\Psi 2b$, and then between the complex impulse responses $\Psi 2b$ and $\Psi 3b$. The same is repeated for the other frames. The mean phase difference is calculated from the results, which is then used to estimate the Doppler frequency FIG. 15A shows the structure of a maximum value finder according to the third embodiment of the invention. This maximum value finder 12a-1 comprises the following elements: a power calculator 121, a timer 122, a peak detector 123, a memory 124, and a complex impulse response extractor 125. The maximum value finder 12a-1 will be used in the digital radio receiver 100 of FIG. 13 in place of the maximum value finder 12a-1.

The power calculator 121 calculates the power of each complex impulse response provided from the complex impulse response measurement unit 11 (FIG. 13). The timer 122 permits the resultant power values to reach to the next block at given averaging intervals. The term "averaging interval" refers to the duration of a predetermined number of frames that are directed to the average operator 13. The output $\phi_n(i)$ of the timer 122 at the i-th time position in the nth frame is expressed as follows:

$$\phi_n(i)=\{\Psi_n(i)\}^2 \qquad (9)$$

where $\Psi_n(i)$ is a complex impulse response at time position i. At the beginning of each averaging interval of the average operator 13, the peak detector 123 determines the time position $i_{max}$ at which the power $\phi_n(i)$ hits a peak. The memory 124 keeps this position $i_{max}$ for use in the present averaging interval and updates it at the averaging intervals.

The complex impulse response extractor 125 receives complex impulse responses from the complex impulse response measurement unit 11. After giving an appropriate delay to them for synchronization purposes, the complex impulse response extractor 125 extracts one of the complex impulse responses that is located at the time position $i_{max}$, which is recorded in the memory 124. The complex impulse response extracted in each frame is then supplied to the delay operator 12b and phase difference detector 12c shown in FIG. 13.

Figure 15B:
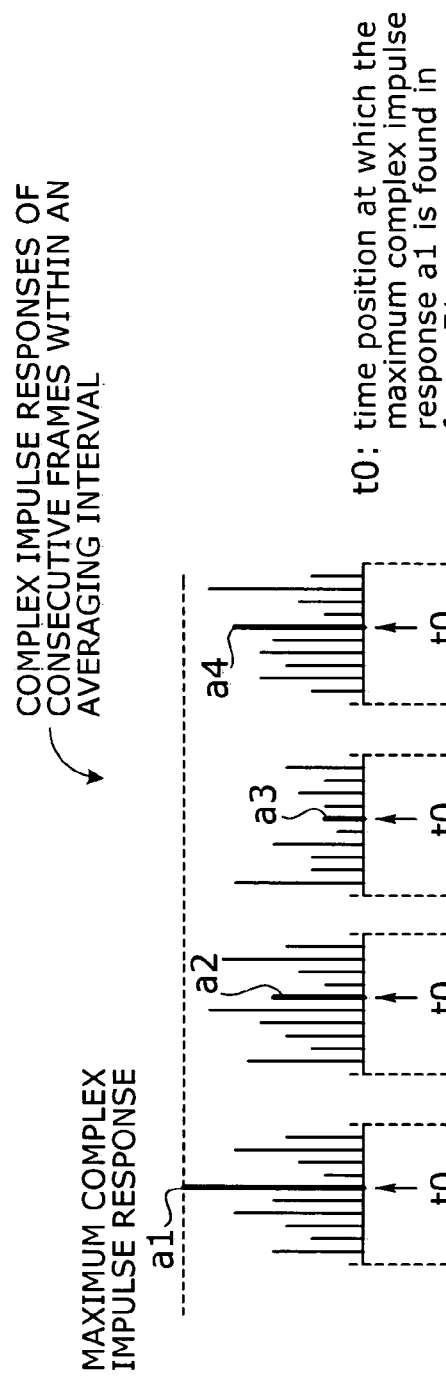
FIG. 15B illustrates how it works.

FIG. 15B shows how the maximum value finder 12a-1 works. For ease of understanding, FIG. 15B illustrates complex impulse responses (in terms of the power) of frames F1 to F4 in an averaging interval. Suppose here that the first frame F1 has a maximum complex impulse response a1 at t0. The memory 124 then records the time position t0, and the complex impulse response extractor 125 extracts that maximum complex impulse response a1 from the frame F1. For the subsequent frames F2, F3, and F4, the complex impulse response extractor 125 extracts complex impulse responses a2, a3, and a4, respectively, all at the same time position t0. Those complex impulse responses are then passed from the maximum value finder 12a-1 to the delay operator 12b, phase difference detector 12c for calculation of absolute phase differences.

Modified Third Embodiment

This section describes a variation of the third embodiment of the present invention. The foregoing third embodiment finds a maximum complex impulse response in one frame, and it uses that time position of the maximum response to extract complex impulse responses in the other frames in the same averaging interval, so as to calculate phase differences between the extracted complex impulse responses. The step of determining the time position is now modified as follows. First, the average power of complex impulse responses at each particular time position is, calculated over a plurality of frames within an averaging interval. Then a time position at which the average power hits a peak is identified. Complex impulse responses at the identified time position are extracted for use in the calculation of absolute phase differences. While the algorithm is modified as such, the result is similar to that of the original third embodiment of the invention.

Figure 16:
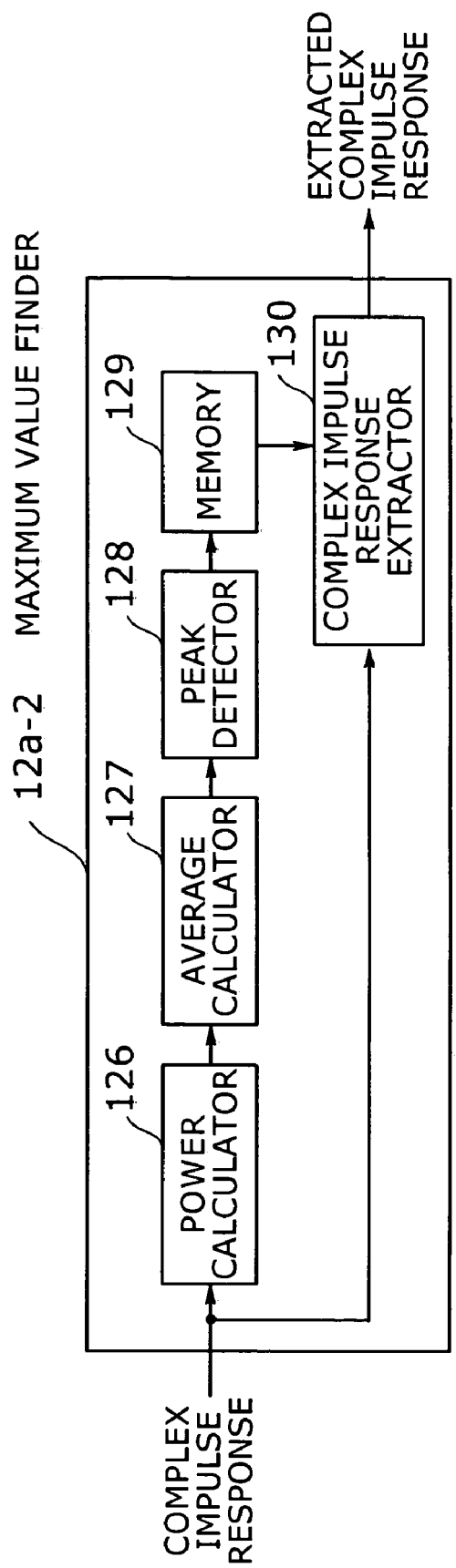
FIG. 16 shows the structure of another maximum value finder for use in a variation of the third embodiment.

FIG. 16 shows the structure of another maximum value finder for use in the modified version of the third embodiment. This maximum value finder 12a-2 comprises a power calculator 126, an average calculator 127, a peak detector 128, a memory 129, and a complex impulse response extractor 130.

The power calculator 126 calculates the power of each complex impulse response provided from the complex impulse response measurement unit 11 (FIG. 13). The average calculator 127 calculates the average power of complex impulse responses within an averaging interval of the average operator 13. Its output $\phi(i)$ in the nth frame is expressed as follows:

$$\phi(i) = \frac{1}{M} \sum_{m=0}^{M-1} \{\Psi_{n-m}(i)\}^2 \qquad (10)$$

where i represents the time position, $\Psi_n$ (i) represents a complex impulse response at time position i, and M denotes the number of frames in an averaging interval. Consider the case of M=4, for example. Then the above equation (10) is expanded as follows: $\phi(i)=((\Psi_n(i))^2+(\Psi_{n-1}(i))^2+(\Psi_{n-2}(i))^2+(\Psi_{n-3}(i))^2)/4$. This value represents the average power of complex impulse responses at a particular time position i of all the four frames n to (n−3).

In each averaging interval of the average operator 13, the peak detector 128 determines the time position $i_{max}$ at which the average power $\phi(i)$ hits a peak. The memory 124 keeps this $i_{max}$ for use in the present averaging interval and updates it at the averaging intervals. The complex impulse response extractor 130 receives complex impulse responses from the complex impulse response measurement unit 11. After giving an appropriate delay to them for synchronization purposes, the complex impulse response extractor 130 extracts one of the complex impulse responses that is found at the time position $i_{max}$, which is recorded in the memory 129. The extracted complex impulse responses are then supplied to the delay operator 12b and phase difference detector 12c shown in FIG. 13.

Figure 17:
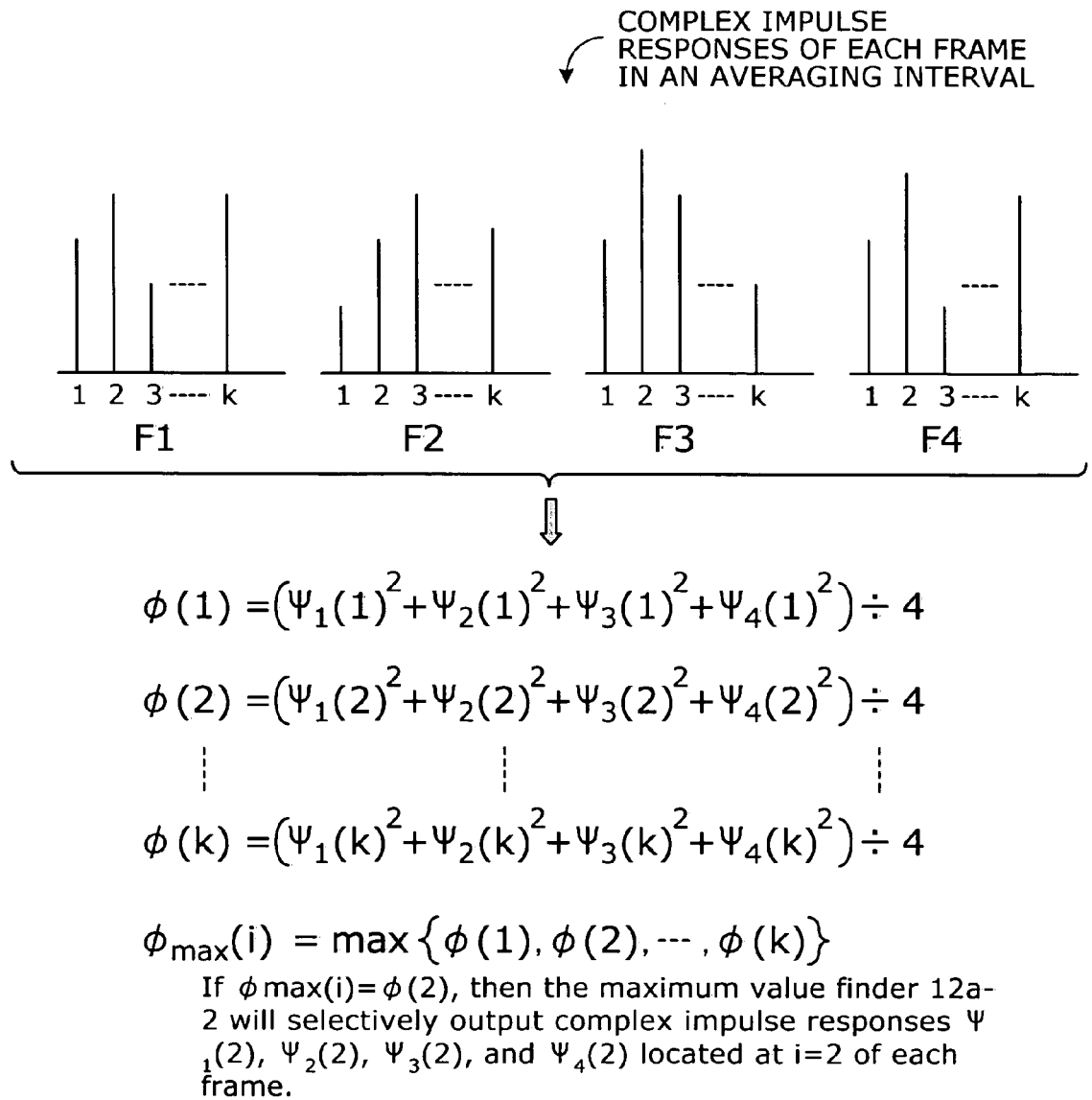
FIG. 17 shows how the maximum value finder of FIG. 16 operates.

FIG. 17 shows how the maximum value finder 12a-2 of FIG. 16 operates. The upper half of FIG. 17 illustrates an average power distribution of complex impulse responses at individual time positions i to k of each of four consecutive frames F1 to F4 constituting an averaging interval. The lower half of FIG. 17 gives a set of equations representing the averaged output signals $\phi(i)$ of the average calculator 127, which are derived by applying equation (10) to the above complex impulse responses. The peak detector 128 seeks the maximum among $\phi(1)$ to $\phi(k)$. Suppose, for example, that $\phi(2)$ is the largest. The memory 129 records i=2, and the complex impulse response extractor 130 extracts the complex impulse responses at i=2 from each frame F1 to F4, thus outputting $\Psi_1(2)$, $\Psi_2(2)$, $\Psi_3(2)$, and $\Psi_4(2)$.

Digital Receiver with AFC

This section describes a variant of the digital radio receiver 100 explained earlier in FIG. 13. As mentioned, phase variations $\Delta\theta n$ contains fading-induced components and frequency offset-induced components. Frequency offset-induced components could dominate the result of Doppler frequency estimation when they are substantially equal to or larger than fading-induced components. To reduce the effect of frequency offset on the estimation, the digital radio receiver 100 is now modified to have automatic frequency control (AFC) functions.

Figure 18:
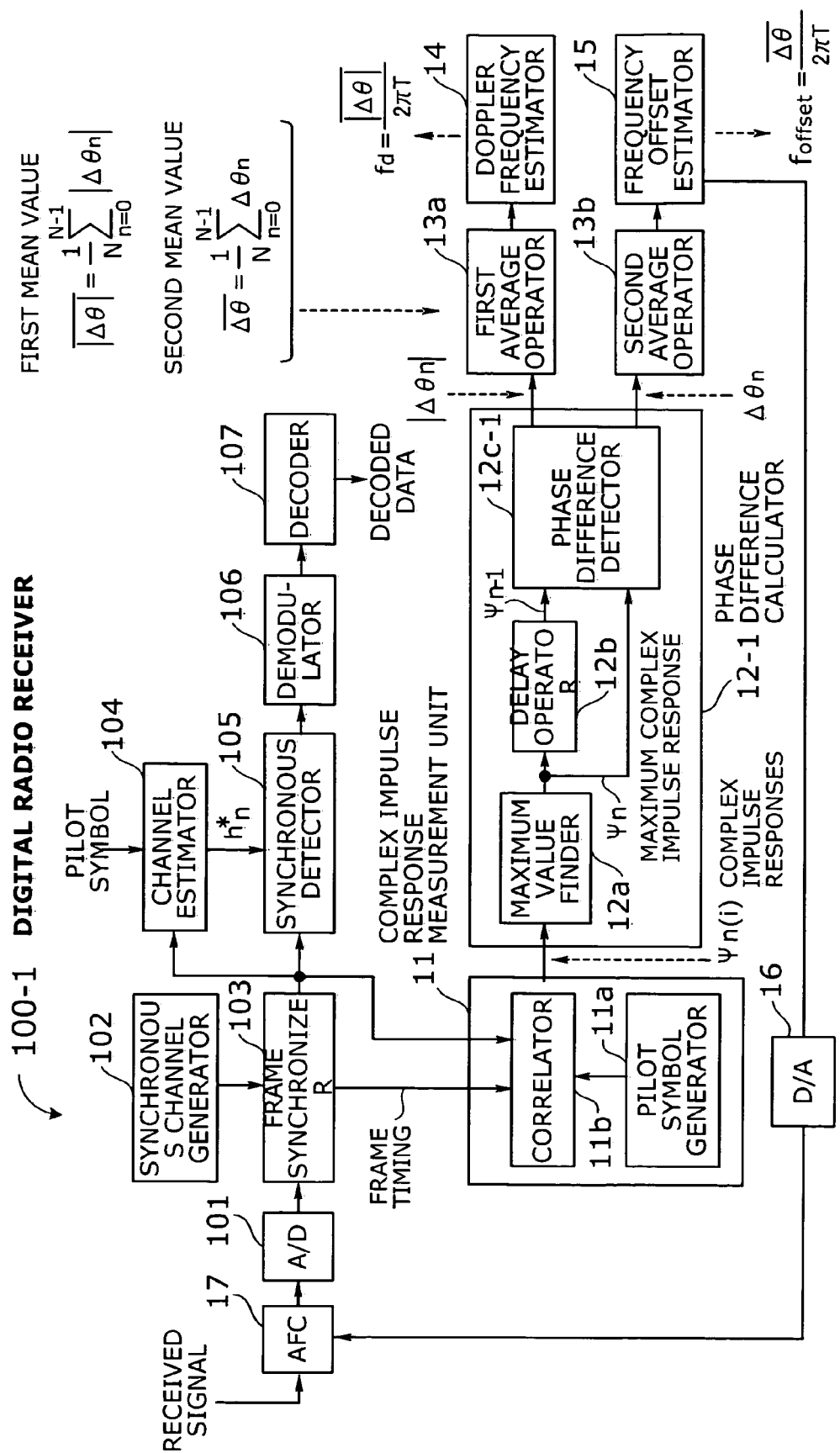
FIG. 18 shows the structure of a modified version of the digital radio receiver.

FIG. 18 shows the structure of a modified version of the digital radio receiver 100 of the invention. Since this digital radio receiver 100-1 shares some common elements with the receiver 100 we have discussed in FIG. 13, the following explanation will not repeat the explanation for such similar elements, but concentrate on the distinctive features, while affixing like reference numerals to like elements. The illustrated digital radio receiver 100-1 has a data reconstructing section composed of an A/D converter 101, a synchronous channel generator 102, a frame synchronizer 103, a channel estimator 104, a synchronous detector 105, a demodulator 106, and a decoder 107. In addition to the above, the digital radio receiver 100-1 comprises the following elements: a complex impulse response measurement unit 11, a phase difference calculator 12-1, a first average operator 13a, a second average operator 13b, a Doppler frequency estimator 14, a frequency offset estimator 15, a digital-to-analog (D/A) converter 16, and an AFC unit 17. The complex impulse response measurement unit 11 has a pilot symbol generator 11a and a correlator 11b. The phase difference calculator 12-1 has a maximum value finder 12a, a delay operator 12b, and a phase difference detector 12c-1.

In the phase difference calculator 12-1, the phase difference detector 12c-1 calculates signed phase differences $\Delta\theta n$ between complex impulse responses in consecutive frames, as well as their respective absolute. values $|\Delta\theta n|$. The first average operator 13a obtains a first mean value by averaging the absolute phase differences $|\Delta\theta n|$ over an a plurality of frames. The second average operator 13b obtains a second mean value by averaging the signed phase differences $\Delta\theta n$ over a plurality of frames.

The Doppler frequency estimator 14 translates the first mean value into a Doppler frequency in units of Hz. The frequency offset estimator 15 translates the second mean value into a frequency offset in units of Hz, and the D/A converter 16 converts that estimate into analog form. The AFC unit 17 corrects the received signal to cancel the effect of frequency offset, based on the amount of the frequency offset estimate supplied through the D/A converter 16. The corrected signal is sent to the A/D converter 101.

OFDM Receiver Applications

The communications device 10 of the present invention can be applied to receivers with an orthogonal frequency division multiplexing (OFDM) system. OFDM creates many orthogonal subcarriers in a given transmission band, the amplitude and phase of each subcarrier signal being varied to convey data by using digital modulation techniques such as PSK and QAM. As the name implies, the OFDM system divides a given transmission band into a number of subcarrier bands. The use of longer symbols with a narrower bandwidth per subcarrier mitigates inter-symbol interference (ISI) due to multipath propagation of waves, as does the addition of guard intervals. Also effective to ISI suppression is frequency and time interleaving. Further, it is possible to minimize the distance between subcarriers by modulating all subcarriers synchronously and thus maintaining their orthogonality in the frequency domain. This feature of OFDM offers an improved spectral efficiency.

Because of the benefits named above, many researchers have investigated the use of OFDM techniques in digital terrestrial television broadcasting systems, which are prone to multipath interference. One example of such efforts is the terrestrial integrated services digital broadcasting (ISDB-T) standards, which is at the stage of test broadcasts.

OFDM receivers calculate a channel estimate $h_{n,m}$ (n: frame number, m: subcarrier number) for individual subcarriers by using pilot symbols that are multiplexed on every subcarrier channel. The data channel of each subcarrier is synchronously detected according to the corresponding channel estimate, and the resulting signal is then demodulated and error-corrected to reproduce the transmitted data.

The present invention can be applied to an OFDM receiver as follows. First, channel estimates $h_{n,m}$ are subjected to inverse Fourier transform to yield complex impulse responses of the received signal. The Doppler frequency estimator of the present invention then detects a maximum complex impulse response at every frame interval, calculates the absolute phase differences between consecutive frames, and averages the results over a plurality of frames. Finally, it translates the resultant mean value into an estimate of Doppler frequency.

Figure 19:
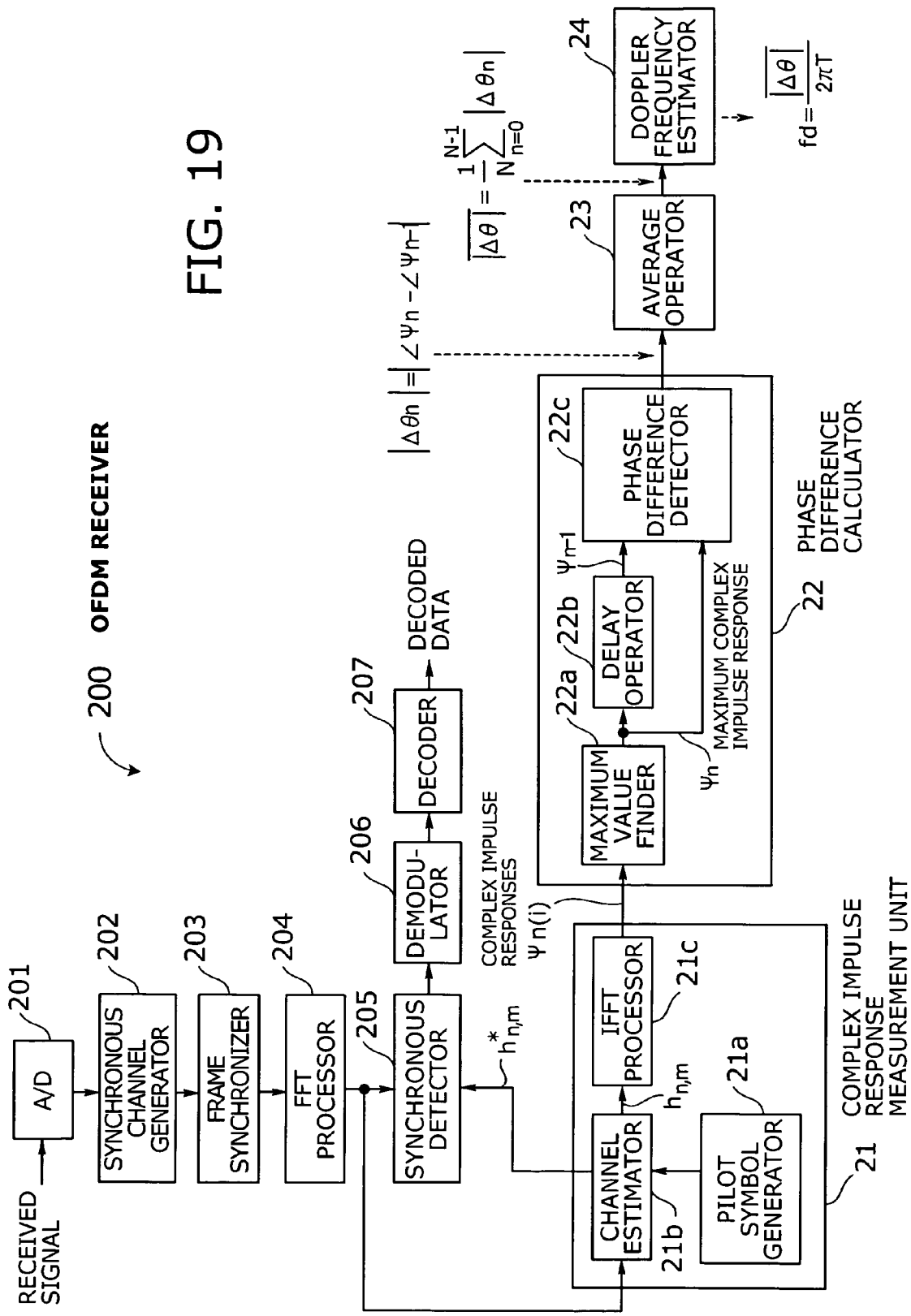
FIG. 19 shows the structure of an OFDM receiver.
Figure 20:
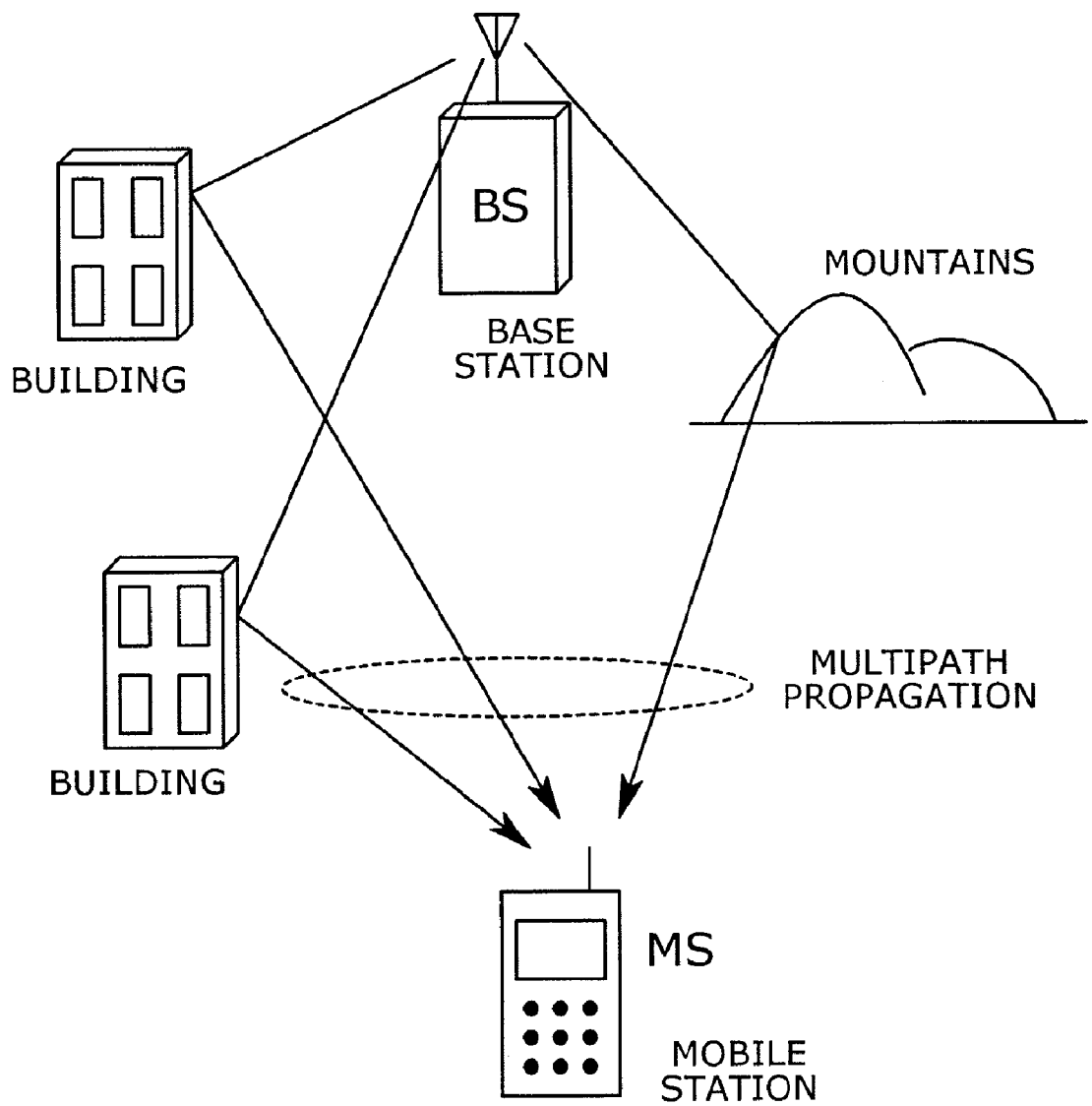
FIG. 20 shows a simplified model of propagation between a base station and a mobile station.

FIG. 19 shows the structure of an OFDM receiver. The illustrated OFDM receiver 200 has a data reconstructing section comprising an A/D converter 201, a synchronous channel generator 202, a frame synchronizer 203, a fast Fourier transform (FFT) processor 204, a synchronous detector 205, a demodulator 206, and a decoder 207. In addition to the above, the OFDM receiver 200 contains the following elements designed according to the present invention: a complex impulse response measurement unit 21, a phase difference calculator 22, an average operator 23, and a Doppler frequency estimator 24. The complex impulse response measurement unit 21 has a pilot symbol generator 21a, a channel estimator 21b, and an inverse fast Fourier transform (IFFT) processor 21c. The phase difference calculator 22 has a maximum value finder 22a, a delay operator 22b, and a phase difference detector 22c.

An RF signal received at an antenna (not shown) is supplied to the A/D converter 201, which converts the frequency of the received signal and performs orthogonal detection to split it into I-channel and Q-channel baseband signals. The A/D converter 201 converts the two signals into digital form for processing in the subsequent blocks. The synchronous channel generator 202 produces a replica of synchronous channel, which is to be used by the frame synchronizer 203 to detect frame timings. The frame synchronizer 203 examines the A/D-converted signals with reference to the synchronous channel, thus detecting the beginning of each frame contained in the signal.

The FFT processor 204 performs Fourier transform to divide a given wideband time-domain signal into frequency-domain subcarrier signals. The synchronous detector 205 performs detection to reproduce the original transmission signal, while removing the effect of multipath propagation from the received signal according to estimated channel parameters. The demodulator 206 demodulates the modulated signal, thus reconstructing a stream of data. The data stream has been processed, at the sending end, with an error correction coding technique such as convolutional coding and turbo coding. The decoder 207 uses this error correction code to recover lost data bits, if any.

In the complex impulse response measurement unit 21, the pilot symbol generator 21a creates pilot symbols, and the channel estimator 21b estimates channel parameters using the pilot symbols. The IFFT processor 21c outputs a set of complex impulse responses $\Psi n(i)$ in the time domain by performing the inverse Fourier transform on the estimated channel parameters of each subcarrier channel.

In the phase difference calculator 22, the maximum value finder 22a finds a maximum complex impulse response $\Psi n$ among the complex impulse responses $\Psi n(i)$ in each frame. The delay operator 22b delays the detected maximum complex impulse response $\Psi n$ by one frame (accordingly, what appears at its output is the previous frame's maximum complex impulse response $\Psi n-1$). The phase difference detector 22c calculates $|\Delta\theta n|=|\angle\Psi n-\angle\Psi n-1|$, i.e., the absolute phase difference between maximum complex impulse responses of two consecutive frames.

The average operator 23 then averages those absolute phase differences over a plurality of consecutive frames, thus obtaining a mean absolute phase difference. Finally, the Doppler frequency estimator 14 translates the mean value into a Doppler frequency in units of Hz. While a function to eliminate the effect of frequency offset may be implemented for more accurate Doppler frequency estimation, we omit the explanation of this variant of the OFDM receiver.

The above-described OFDM receiver may employ an AFC function to improve its performance. To achieve this, the phase difference calculator 12-1, second average operator 13b, frequency offset estimator 15, and AFC unit 17 shown in FIG. 18 will be added to the OFDM receiver 200 of FIG. 19. Although we do not describe the details of this optional configuration, the person skilled in the art would appreciate that such a variation is technically possible.

Conclusion

We have described several embodiments of the present invention and their applications. While we have assumed, for simplicity of explanation, the presence of a single dominant complex impulse response, the phase difference calculator may actually find two or more complex impulse responses with comparable magnitudes. Particularly in the third embodiment, there may be two or more time positions at which the impulse responses exhibit comparably large (mean) power. One solution in those cases is to calculate absolute phase differences at each different time position and use the average of the results in estimating Doppler frequency.

To summarize the invention, the proposed communications device estimates the Doppler frequency by calculating complex time-domain response signals of a given propagation path in each radio frame, averaging absolute phase differences between selected complex time-domain response signals over a plurality of frames, and translating the mean absolute phase difference into an estimate of Doppler frequency. The communications device selectively uses multi-path wave components with relatively high S/N ratios in its estimation process, thus providing an accurate estimate even in a low S/N radio environment. In OFDM applications, the feature of accurate Doppler frequency estimation will contribute to quality improvement in terrestrial broadcasting services.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications device for communication over wireless channels, comprising:
    a complex time-domain response measurement unit that obtains, at radio frame intervals, complex time-domain response signals representing characteristics of propagation paths;
    a phase difference calculator that calculates absolute phase differences between the complex time-domain response signals that are selected;
    an average operator that calculates a mean value of the absolute phase differences over a plurality of radio frames; and
    a Doppler frequency estimator that estimates Doppler frequency by dividing the mean value by a time length of one of the radio frames.

2. The communications device according to claim 1, wherein said complex time-domain response measurement unit calculates the complex time-domain response signals from known pilot symbols or synchronous channel signals which are multiplexed on each radio frame.

3. The communications device according to claim 1, wherein said phase difference calculator extracts a maximum complex time-domain response signal of an (n−1)th frame, identifies a time position of the extracted maximum complex time-domain response signal, and calculates an absolute phase difference between the maximum complex time-domain response signal of the (n−1)th frame and a complex time-domain response signal at the identified time position of an nth frame.

4. The communications device according to claim 1, wherein said phase difference calculator selects one of the complex time-domain response signals, identifies a time position of the selected complex time-domain response signal, extracts complex time-domain response signals at the identified time position in consecutive radio frames, and calculates absolute phase differences between the extracted complex time-domain response signals.

5. The communications device according to claim 1, wherein said phase difference calculator calculates average power of complex time-domain response signals at each different time position over a plurality of frames within an averaging interval, identifies a time position at which the average power hits a peak, extracts complex time-domain response signals at the identified time position in consecutive radio frames, and calculates absolute phase differences between the extracted complex time-domain response signals.

6. A communications device for communication over wireless channels, comprising:
  a complex time-domain response measurement unit that obtains complex time-domain response signals from a received signal at radio frame intervals, the complex time-domain response signals representing characteristics of propagation paths, the received signal being affected by a frequency offset;
  a phase difference calculator that calculates signed phase differences and absolute phase differences between the complex time-domain response signals that are selected;
  a first average operator that obtains a first mean value by averaging the absolute phase differences over a plurality of radio frames;
  a second average operator that obtains a second mean value by averaging the signed phase differences over the plurality of radio frames;
  a frequency offset estimator that estimates the frequency offset by dividing the second mean value by a time length of one of the radio frames;
  an automatic frequency control (AFC) unit that reduces effects of the frequency offset, based on the estimated frequency offset; and
  a Doppler frequency estimator that estimates Doppler frequency by dividing the first mean value by the time length.

7. The communications device according to claim 6, wherein said complex time-domain response measurement unit calculates the complex time-domain response signals from known pilot symbols or synchronous channel signals which are multiplexed on each radio frame.

8. The communications device according to claim 6, wherein said phase difference calculator extracts a maximum complex time-domain response signal of an (n−1)th frame, identifies a time position of the extracted maximum complex time-domain response signal, and calculates a signed phase difference and an absolute phase difference between the maximum complex time-domain response signal of the (n−1)th frame and a complex time-domain response signal at the identified time position of an nth frame.

9. The communications device according to claim 6, wherein said phase difference calculator selects one of the complex time-domain response signals, identifies a time position of the selected complex time-domain response signal, extracts complex time-domain response signals at the identified time position in consecutive radio frames, and calculates signed phase differences and absolute phase differences between the extracted complex time-domain response signals.

10. The communications device according to claim 6, wherein said phase difference calculator calculates average power of complex time-domain response signals at each different time position over a plurality of frames within an averaging interval, identifies a time position at which the average power hits a peak, extracts complex time-domain response signals at the identified time position in consecutive radio frames, and calculates signed phase differences and absolute phase differences between the extracted complex time-domain response signals.

11. An orthogonal frequency division multiplexing (OFDM) receiver that receives an OFDM-modulated signal, comprising:
  a complex time-domain response measurement unit that estimates subcarrier channels for each radio frame and obtains complex time-domain response signals by performing inverse Fourier transform on all the subcarrier channel estimates;
  a phase difference calculator that calculates absolute phase differences between the complex time-domain response signals that are selected;
  an average operator that calculates a mean value of the absolute phase differences over a plurality of radio frames; and
  a Doppler frequency estimator that estimates Doppler frequency by dividing the mean value by a time length of one of the radio frames.

12. The OFDM receiver according to claim 11, wherein said complex time-domain response measurement unit calculates the complex time-domain response signals from known pilot symbols or synchronous channel signals which are multiplexed on each radio frame.

13. The OFDM receiver according to claim 11, wherein said phase difference calculator extracts a maximum complex time-domain response signal of an (n−1)th frame, identifies a time position of the extracted maximum complex time-domain response signal, and calculates an absolute phase difference between the maximum complex time-domain response signal of the (n−1)th frame and a complex time-domain response signal at the identified time position of an nth frame.

14. The OFDM receiver according to claim 11, wherein said phase difference calculator selects one of the complex time-domain response signals, identifies a time position of the selected complex time-domain response signal, extracts complex time-domain response signals at the identified time position in consecutive radio frames, and calculates absolute phase differences between the extracted complex time-domain response signals.

15. The OFDM receiver according to claim 11, wherein said phase difference calculator calculates average power of complex time-domain response signals at each different time position over a plurality of frames within an averaging interval, identifies a time position at which the average power hits a peak, extracts complex time-domain response signals at the identified time position in consecutive radio frames, and calculates absolute phase differences between the extracted complex time-domain response signals.

16. An orthogonal frequency division multiplexing (OFDM) receiver that receives an OFDM-modulated signal, comprising:
    a complex time-domain response measurement unit that estimates subcarrier channels for each radio frame of a received signal and obtains complex time-domain response signals by performing inverse Fourier transform on all the subcarrier channel estimates, the received signal being affected by a frequency offset;
    a phase difference calculator that calculates signed phase differences and absolute phase differences between the complex time-domain response signals that are selected;
    a first average operator that obtains a first mean value by averaging the absolute phase differences over a plurality of radio frames;
    a second average operator that obtains a second mean value by averaging the signed phase differences over the plurality of radio frames;
    a frequency offset estimator that estimates the frequency offset by dividing the second mean value by a time length of one of the radio frames;
    an automatic frequency control (AFC) unit that reduces effects of the frequency offset, based on the estimated frequency offset; and
    a Doppler frequency estimator that estimates Doppler frequency by dividing the first mean value by the time length.

17. The OFDM receiver according to claim 16, wherein said complex time-domain response measurement unit calculates the complex time-domain response signals from known pilot symbols or synchronous channel signals which are multiplexed on each radio frame.

18. The OFDM receiver according to claim 16, wherein said phase difference calculator extracts a maximum complex time-domain response signal of an (n−1)th frame, identifies a time position of the extracted maximum complex time-domain response signal, and calculates a signed phase difference and an absolute phase difference between the maximum complex time-domain response signal of the (n−1)th frame and a complex time-domain response signal at the identified time position of an nth frame.

19. The OFDM receiver according to claim 16, wherein said phase difference calculator selects one of the complex time-domain response signals, identifies a time position of the selected complex time-domain response signal, extracts complex time-domain response signals at the identified time position in consecutive radio frames, and calculates signed phase differences and absolute phase differences between the extracted complex time-domain response signals.

20. The OFDM receiver according to claim 16, wherein said phase difference calculator calculates average power of complex time-domain response signals at each different time position over a plurality of frames within an averaging interval, identifies a time position at which the average power hits a peak, extracts complex time-domain response signals at the identified time position in consecutive radio frames, and calculates signed phase differences and absolute phase differences between the extracted complex time-domain response signals.

21. A method of estimating Doppler frequency that occurs in proportion to speed of a mobile station, the method comprising the steps of:
    (a) obtaining, at radio frame intervals, complex time-domain response signals representing characteristics of propagation paths;
    (b) calculating absolute phase differences between the complex time-domain response signals that are selected;
    (c) calculating a mean value of the absolute phase differences over a plurality of radio frames; and
    (d) estimating Doppler frequency by dividing the mean value by a time length of one of the radio frames.

22. The method according to claim 21, wherein said obtaining step (a) calculates the complex time-domain response signals from known pilot symbols or synchronous channel signals which are multiplexed on each radio frame.

23. The method according to claim 21, wherein said calculating step (b) comprises the substeps of:
    extracting a maximum complex time-domain response signal of an (n−1)th frame;
    identifying a time position of the extracted maximum complex time-domain response signal; and
    calculating an absolute phase difference between the maximum complex time-domain response signal of the (n−1)th frame and a complex time-domain response signal at the identified time position of an nth frame.

24. The method according to claim 21, wherein said calculating step (b) comprises the substeps of:
    selecting one of the complex time-domain response signals;
    identifying a time position of the selected complex time-domain response signal;
    extracting complex time-domain response signals at the identified time position in consecutive radio frames; and
    calculating absolute phase differences between the extracted complex time-domain response signals.

25. The method according to claim 21, wherein said calculating step (b) comprises the substeps of:
    calculating average power of complex time-domain response signals at each different time position over a plurality of frames within an averaging interval;
    identifying a time position at which the average power hits a peak;
    extracting complex time-domain response signals at the identified time position in consecutive radio frames; and
    calculating absolute phase differences between the extracted complex time-domain response signals.

26. The method according to claim 21, wherein:
    the mobile station receives an OFDM-modulated signal; and
    said obtaining step (a) comprises the substeps of:
    estimating subcarrier channels for each radio frame, and
    obtaining complex time-domain response signals by performing inverse Fourier transform on all the subcarrier channel estimates.

27. A method of estimating Doppler frequency that occurs in proportion to speed of a mobile station, the method comprising the steps of:
    (a) obtaining complex time-domain response signals from a received signal at radio frame intervals, the complex time-domain response signals representing characteristics of propagation paths, the received signal being affected by a frequency offset;
    (b) calculating signed phase differences and absolute phase differences between the complex time-domain response signals that are selected;

(c) obtaining a first mean value by averaging the absolute phase differences over a plurality of radio frames;

(d) obtaining a second mean value by averaging the signed phase differences over the plurality of radio frames;

(e) estimating the frequency offset by dividing the second mean value by a time length of one of the radio frames;

(f) reducing effects of the frequency offset, based on the estimated frequency offset; and (g) estimating Doppler frequency by dividing the first mean value by the time length.

28. The method according to claim 27, wherein said obtaining step (a) calculates the complex time-domain response signals from known pilot symbols or synchronous channel signals which are multiplexed on each radio frame.

29. The method according to claim 27, wherein said calculating step (b) comprises the substeps of:

extracting a maximum complex time-domain response signal of an (n−1)th frame;

identifying a time position of the extracted maximum complex time-domain response signal; and calculating a signed phase difference and an absolute phase difference between the maximum complex time-domain response signal of the (n−1)th frame and a complex time-domain response signal at the identified time position of an nth frame.

30. The method according to claim 27, wherein said calculating step (b) comprises the substeps of:

selecting one of the complex time-domain response signals;

identifying a time position of the selected complex time-domain response signal;

extracting complex time-domain response signals at the identified time position in consecutive radio frames; and calculating signed phase differences and absolute phase differences between the extracted complex time-domain response signals.

31. The method according to claim 27, wherein said calculating step (b) comprises the substeps of:

calculating average power of complex time-domain response signals at each different time position over a plurality of frames within an averaging interval;

identifying a time position at which the average power hits a peak;

extracting complex time-domain response signals at the identified time position in consecutive radio frames; and calculating signed phase differences and absolute phase differences between the extracted complex time-domain response signals.

32. The method according to claim 27, wherein:

the mobile station receives an OFDM-modulated signal; and said obtaining step (a) comprises the substeps of:

estimating subcarrier channels for each radio frame, and obtaining complex time-domain response signals by performing inverse Fourier transform on all the subcarrier channel estimates.

* * * * *